US012786998B2

United States Patent
(12) United States Patent
Kasan et al.

(10) Patent No.: US 12,786,998 B2
(45) Date of Patent: Nov. 3, 2026

(54) BANDWIDTH PART SWITCHING

(71) Applicant: Nokia Technologies Oy, Espoo (FI)

(72) Inventors: Karim Kasan, Massy (FR); Nhat-Quang Nhan, Massy (FR); Marco Maso, Massy (FR); Majed Saad, Massy (FR); Amir Mehdi Ahmadian Tehrani, Munich (DE); Alessio Marcone, Munich (DE)

(73) Assignee: Nokia Technologies Oy, Espoo (FI)

( * ) Notice: Subject to any disclaimer, the term of this patent is extended or adjusted under 35 U.S.C. 154(b) by 233 days.

(21) Appl. No.: 18/829,798

(22) Filed: Sep. 10, 2024

(65) Prior Publication Data

US 2025/0113352 A1 Apr. 3, 2025

(30) Foreign Application Priority Data

Sep. 29, 2023 (GB) ..................................... 2314976

(51) Int. Cl.
*H04W 72/1268* (2023.01)
*H04W 72/0457* (2023.01)
*H04W 72/232* (2023.01)

(52) U.S. Cl.
CPC ... *H04W 72/1268* (2013.01); *H04W 72/0457* (2023.01); *H04W 72/232* (2023.01)

(58) Field of Classification Search
None
See application file for complete search history.

(56) References Cited

U.S. PATENT DOCUMENTS

| | | | |
|---|---|---|---|
| 2020/0351837 A1 | 11/2020 | Hwang et al. | |
| 2020/0396760 A1 | 12/2020 | Yi et al. | |
| 2021/0314738 A1 | 10/2021 | Abdoli et al. | |
| 2021/0360616 A1 | 11/2021 | Yi et al. | |
| 2022/0272730 A1 | 8/2022 | Li et al. | |
| 2022/0369351 A1 | 11/2022 | Sakhnini et al. | |
| 2024/0267931 A1 * | 8/2024 | Zhou | H04L 5/001 |

(Continued)

OTHER PUBLICATIONS

"New WI: Further NR coverage enhancements", 3GPP TSG RAN Meeting #94e, RP-213579, Agenda: 8.6.1, China Telecom, Dec. 6-17, 2021, 5 pages.

(Continued)

*Primary Examiner* — Angela Nguyen
(74) *Attorney, Agent, or Firm* — Nokia Technologies Oy

(57) ABSTRACT

In example embodiments of the present disclosure, an apparatus receives a downlink control information (DCI) message in a first BWP, wherein the DCI message schedules, based on a condition being met, a physical uplink shared channel transmission and indicates to perform the transmission on a second BWP, wherein the condition comprising at least one of: a dynamic transform precoder indication (DTPI) information element is configured and set to enabled for the first BWP, a DTPI information element is configured and set to enabled for the second BWP, a bit-width of a frequency domain resource assignment (FDRA) field for the first BWP is smaller than a bit-width of an FDRA field for the second BWP in the DCI message, dynamic switching is configured in a resource allocation information element for the second BWP, and/or the DCI message includes a transform precoder indicator field set to disabled.

17 Claims, 9 Drawing Sheets

(56) References Cited

U.S. PATENT DOCUMENTS

2025/0133550 A1* 4/2025 Xu ...................... H04L 27/2666
2025/0220683 A1* 7/2025 Liang .................... H04W 72/12

OTHER PUBLICATIONS

"3rd Generation Partnership Project; Technical Specification Group Radio Access Network; NR; Physical layer procedures for data (Release 17)", 3GPP TS 38.214, V17.6.0, Jun. 2023, pp. 1-231.
"3rd Generation Partnership Project; Technical Specification Group Radio Access Network; NR; Multiplexing and channel coding (Release 17)", 3GPP TS 38.212, V17.5.0, Mar. 2023, pp. 1-203.
"3rd Generation Partnership Project; Technical Specification Group Radio Access Network; NR; Physical layer procedures for control (Release 17)", 3GPP TS 38.213, V17.6.0, Jun. 2023, pp. 1-262.
"Remaining issues on dynamic switching between DFT-s-OFDM and CP-OFDM", 3GPP TSG RAN WG1 #114bis, R1-23xxxxx, Agenda: 8.8.3, Nokia, Oct. 9-13, 2023, 5 pages.
"IEEE 802.11", Wikipedia, Retrieved on Oct. 8, 2024, Webpage available at : https://en.wikipedia.org/wiki/IEEE_802.11.
Search Report received for corresponding United Kingdom Patent Application No. 2314976.8, dated Mar. 26, 2024, 2 pages.
Search Report received for corresponding United Kingdom Patent Application No. 2314977.6, dated Mar. 26, 2024, 4 pages.

* cited by examiner

BANDWIDTH PART SWITCHING

CROSS-REFERENCE TO RELATED APPLICATION

The present application claims priority to, and the benefit of, Great Britain Application No. 2314976.8, filed Sep. 29, 2023, the contents of which are hereby incorporated by reference in their entirety.

FIELDS

Various example embodiments of the present disclosure generally relate to the field of telecommunication and in particular, to apparatuses, methods, and computer readable storage medium for bandwidth part switching.

BACKGROUND

If a bandwidth part indicator field is configured to be present in a downlink control information (DCI) format that is transmitted in an active uplink (UL) bandwidth part (BWP) or downlink (DL) BWP and indicates an UL BWP or a DL BWP different from the active UL BWP or DL BWP, respectively, for each information field in the DCI format, if the size of the information field is smaller than the one required for the DCI format interpretation for the UL BWP or DL BWP that is indicated by the bandwidth part indicator, a UE may prepend zeros to the information field until its size is the one required for the interpretation of the information field for the UL BWP or DL BWP indicated by bandwidth part indicator prior to interpreting the DCI format information fields, respectively; if the size of the information field is larger than the one required for the DCI format interpretation for the UL BWP or DL BWP that is indicated by the bandwidth part indicator, the UE may use a number of least significant bits of the information field that is equal to the one required for the interpretation of the information field for the UL BWP or DL BWP indicated by bandwidth part indicator prior to interpreting the DCI format information fields, respectively. The active UL BWP or DL BWP may be set to the UL BWP or DL BWP indicated by the bandwidth part indicator in the DCI format. However, some problems which may occur during a BWP switching need to be solved.

SUMMARY

In a first aspect of the present disclosure, there is provided a first apparatus. The first apparatus comprises at least one processor; and at least one memory storing instructions that, when executed by the at least one processor, cause the first apparatus at least to: receive a downlink control information (DCI) message in a first bandwidth part (BWP), wherein the DCI message, based on a first condition being met, schedules a physical uplink shared channel (PUSCH) transmission and indicates to perform the transmission on a second BWP, and wherein the first condition comprises at least one of: a condition that a dynamic transform precoder indication (DTPI) information element is configured and set to enabled for the first BWP, a condition that a DTPI information element is configured and set to enabled for the second BWP, a condition that a bit-width of a frequency domain resource assignment (FDRA) field for the first BWP is smaller than a bit-width of an FDRA field for the second BWP in the DCI message, a condition that dynamic switching is configured in a resource allocation information element for the second BWP, or a condition that the DCI message includes a transform precoder indicator field set to disabled.

In a second aspect of the present disclosure, there is provided a first apparatus. The first apparatus comprises at least one processor; and at least one memory storing instructions that, when executed by the at least one processor, cause the first apparatus at least to: based on a second condition being met, consider a received downlink control information (DCI) message on a first bandwidth part (BWP) as invalid, wherein the DCI message schedules a physical uplink shared channel (PUSCH) transmission and indicates to perform the transmission on a second BWP, and wherein the second condition comprises at least one of: a condition that a dynamic transform precoder indication (DTPI) information element is not configured or is configured and set to disabled for the first BWP, a condition that a DTPI information element is configured and set to enabled for the second BWP, a condition that resource allocation type 0 is configured in a resource allocation information element for the second BWP, a condition that dynamic switching is configured in a resource allocation information element for the second BWP, a condition that a bit-width of a frequency domain resource assignment (FDRA) field for the first BWP is smaller than a bit-width of an FDRA field for the second BWP in the DCI message, or a condition that the DCI message includes a transform precoder indicator field set to enabled.

In a third aspect of the present disclosure, there is provided a first apparatus. The first apparatus comprises at least one processor; and at least one memory storing instructions that, when executed by the at least one processor, cause the first apparatus at least to: based on a first condition being met, receive a downlink control information (DCI) message in a first bandwidth part (BWP), wherein the DCI message, schedules a physical uplink shared channel (PUSCH) transmission and indicates to perform the transmission on a second BWP, and wherein the first condition comprises at least one of: a condition that a dynamic transform precoder indication (DTPI) information element is configured and set to enabled for the first BWP, a condition that a DTPI information element is configured and set to enabled for the second BWP, a condition that a bit-width of a frequency domain resource assignment (FDRA) field for the first BWP is smaller than a bit-width of an FDRA field for the second BWP in the DCI message, a condition that dynamic switching is configured in a resource allocation information element for the second BWP, or a condition that the DCI message includes a transform precoder indicator field set to 1.

In a fourth aspect of the present disclosure, there is provided a second apparatus. The second apparatus comprises at least one processor; and at least one memory storing instructions that, when executed by the at least one processor, cause the second apparatus at least to: determine a candidate second bandwidth part (BWP) for a first apparatus; based on a first condition being met, determine that the first apparatus is to switch from a first BWP to the second BWP, wherein the first condition comprises at least one of: a condition that a dynamic transform precoder indication (DTPI) information element is configured and set to be enabled for the first BWP, a condition that a DTPI information element is configured and set to be enabled for the second BWP, a condition that a bit-width of a frequency domain resource assignment (FDRA) field for the first BWP is smaller than a bit-width of an FDRA field for the second BWP, or a condition that dynamic switching is configured in a resource allocation information element for the second BWP; and transmit a downlink control information (DCI) message in the first BWP to the first apparatus, wherein the DCI message schedules a physical uplink shared channel (PUSCH) transmission and indicates to perform the transmission on the second BWP, and the DCI message includes a transform precoder indicator field set to 1.

In a fifth aspect of the present disclosure, there is provided a first apparatus. The first apparatus comprises at least one processor; and at least one memory storing instructions that, when executed by the at least one processor, cause the first apparatus at least to: receive a downlink control information (DCI) message in a first bandwidth part (BWP), wherein the DCI message schedules a physical uplink shared channel (PUSCH) transmission and indicates to perform the transmission on a second BWP; based on at least one condition related to at least enabling of a dynamic transform precoder indication (DTPI) information element configured for the second BWP, determine at least one of a resource allocation type or a state of transform precoder for the PUSCH transmission; and perform the PUSCH transmission to a second apparatus on the second BWP using the at least one of the resource allocation type or the state of transform precoder for the PUSCH transmission.

In a sixth aspect of the present disclosure, there is provided a method. The method comprises: based on a first condition being met, receiving a downlink control information (DCI) message in a first bandwidth part (BWP), wherein the DCI message schedules a physical uplink shared channel (PUSCH) transmission and indicates to perform the transmission on the second BWP, and wherein the first condition comprises at least one of: a condition that a dynamic transform precoder indication (DTPI) information element is configured and set to enabled for the first BWP, a condition that a DTPI information element is configured and set to enabled for the second BWP, a condition that a bit-width of a frequency domain resource assignment (FDRA) field for the first BWP is smaller than a bit-width of an FDRA field for the second BWP in the DCI message, a condition that dynamic switching is configured in a resource allocation information element for the second BWP, or a condition that the DCI message includes a transform precoder indicator field set to 1.

In a seventh aspect of the present disclosure, there is provided a method. The method comprises: determining a candidate second bandwidth part (BWP) for a first apparatus; based on a first condition being met, determining that the first apparatus is to switch from a first BWP to the second BWP, wherein the first condition comprises at least one of: a condition that a dynamic transform precoder indication (DTPI) information element is configured and set to be enabled for the first BWP, a condition that a DTPI information element is configured and set to be enabled for the second BWP, a condition that a bit-width of a frequency domain resource assignment (FDRA) field for the first BWP is smaller than a bit-width of an FDRA field for the second BWP, or a condition that dynamic switching is configured in a resource allocation information element for the second BWP; and transmitting a downlink control information (DCI) message in the first BWP to the first apparatus, wherein the DCI message schedules a physical uplink shared channel (PUSCH) transmission and indicates to perform the transmission on the second BWP, and the DCI message includes a transform precoder indicator field set to 1.

In an eight aspect of the present disclosure, there is provided a method. The method comprises: receiving a downlink control information (DCI) message in a first bandwidth part (BWP), wherein the DCI message schedules a physical uplink shared channel (PUSCH) transmission and indicates to perform the transmission on a second BWP; based on at least one condition related to at least enabling of a dynamic transform precoder indication (DTPI) information element configured for the second BWP, determining at least one of a resource allocation type or a state of transform precoder for the PUSCH transmission; and performing the PUSCH transmission to a second apparatus on the second BWP using the at least one of the resource allocation type or the state of transform precoder for the PUSCH transmission.

In a ninth aspect of the present disclosure, there is provided a first apparatus. The first apparatus comprises means for based on a first condition being met, receiving a downlink control information (DCI) message in a first bandwidth part (BWP), wherein the DCI message schedules a physical uplink shared channel (PUSCH) transmission and indicates to perform the transmission on the second BWP, and wherein the first condition comprises at least one of: a condition that a dynamic transform precoder indication (DTPI) information element is configured and set to enabled for the first BWP, a condition that a DTPI information element is configured and set to enabled for the second BWP, a condition that a bit-width of a frequency domain resource assignment (FDRA) field for the first BWP is smaller than a bit-width of an FDRA field for the second BWP in the DCI message, a condition that dynamic switching is configured in a resource allocation information element for the second BWP, or a condition that the DCI message includes a transform precoder indicator field set to 1.

In a tenth aspect of the present disclosure, there is provided a second apparatus. The second apparatus comprises means for determining a candidate second bandwidth part (BWP) for a first apparatus; means for based on a first condition being met, determining that the first apparatus is to switch from a first BWP to the second BWP, wherein the first condition comprises at least one of: a condition that a dynamic transform precoder indication (DTPI) information element is configured and set to be enabled for the first BWP, a condition that a DTPI information element is configured and set to be enabled for the second BWP, a condition that a bit-width of a frequency domain resource assignment (FDRA) field for the first BWP is smaller than a bit-width of an FDRA field for the second BWP, or a condition that dynamic switching is configured in a resource allocation information element for the second BWP; and means for transmitting a downlink control information (DCI) message in the first BWP to the first apparatus, wherein the DCI message schedules a physical uplink shared channel (PUSCH) transmission and indicates to perform the transmission on the second BWP, and the DCI message includes a transform precoder indicator field set to 1.

In an eleventh aspect of the present disclosure, there is provided a first apparatus. The first apparatus comprises means for receiving a downlink control information (DCI) message in a first bandwidth part (BWP), wherein the DCI message schedules a physical uplink shared channel (PUSCH) transmission and indicates to perform the transmission on a second BWP; means for based on at least one condition related to at least enabling of a dynamic transform precoder indication (DTPI) information element configured for the second BWP, determining at least one of a resource allocation type or a state of transform precoder for the PUSCH transmission; and means for performing the PUSCH transmission to a second apparatus on the second BWP using the at least one of the resource allocation type or the state of transform precoder for the PUSCH transmission.

In a twelfth aspect of the present disclosure, there is provided a computer readable medium. The computer readable medium comprises instructions stored thereon for causing an apparatus to perform at least the method according to the fourth, fifth or sixth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
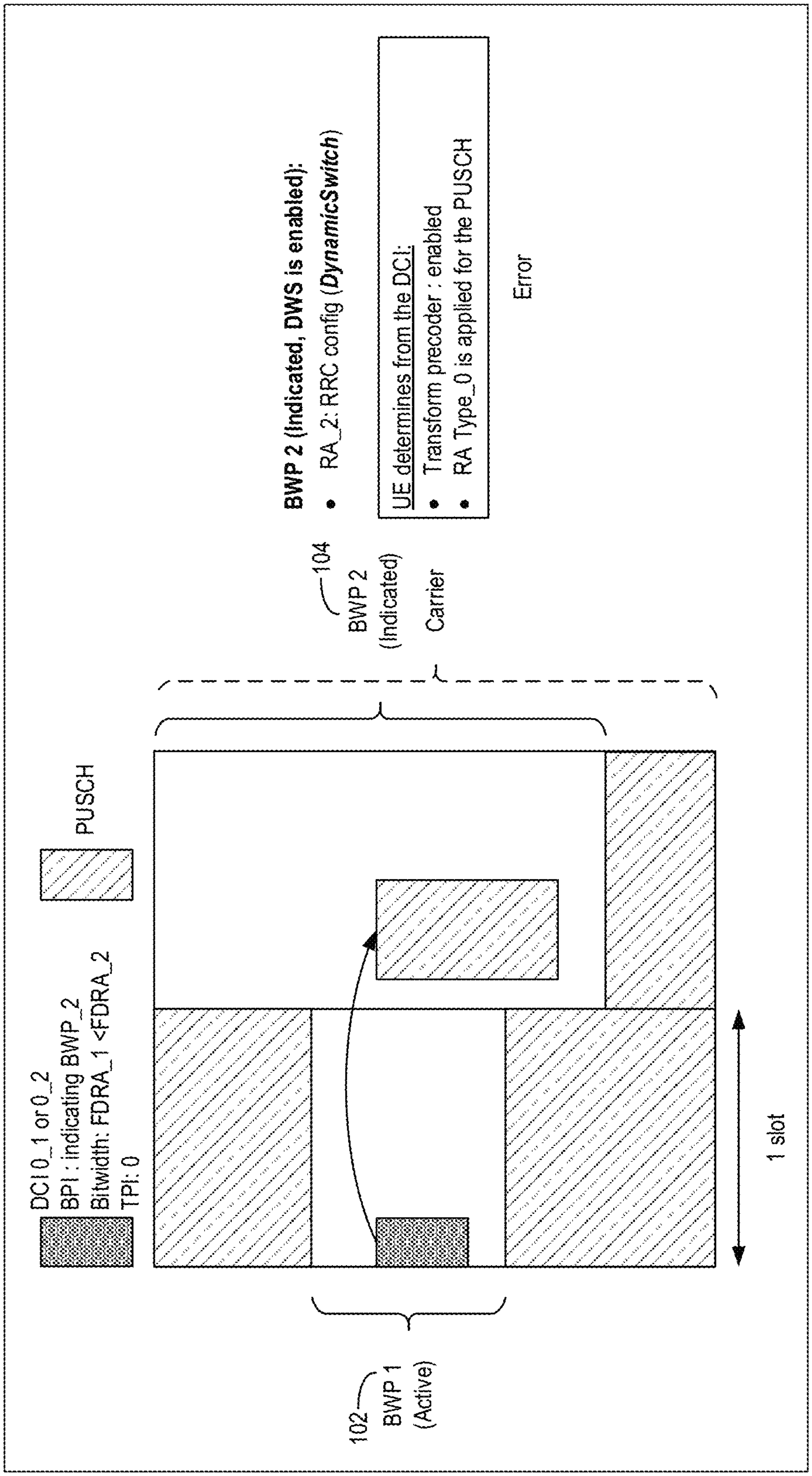
FIG. 1 illustrates example BWP switching with DWS.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second," . . . , etc. in front of noun(s) and the like may be used herein to describe various elements, these elements should not be limited by these terms. These terms are only used to distinguish one element from another and they do not limit the order of the noun(s). For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G), the sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other combination of the time, frequency, space and/or code domain resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

Regarding the bandwidth part indicator field, if this field indicates a bandwidth part other than an active bandwidth part and if resourceAllocation is configured as "dynamicSwitch" for the indicated bandwidth part, a UE may assume a resource allocation type 0 for the indicated bandwidth part if the bit-width of a "frequency domain resource assignment" field of the active bandwidth part is smaller than the bit-width of the "frequency domain resource assignment" field of the indicated bandwidth part. If the "bandwidth part indicator" field indicates a bandwidth part other than the active bandwidth part and if resourceAllocation-DCI-0-2-r16 is configured as "dynamicSwitch" for the indicated bandwidth part, the UE may assume a resource allocation type 0 for the indicated bandwidth part if the bit-width of the "frequency domain resource assignment" field of the active bandwidth part is smaller than the bit-width of the "frequency domain resource assignment" field of the indicated bandwidth part.

In release 18 (Rel-18) of 3GPP specifications, dynamic switching between Discrete Fourier Transform spread Orthogonal Frequency Division Multiplexing (DFT-s-OFDM) and Cyclic prefix (CP)-OFDM waveforms is supported for a PUSCH transmission. This feature is applicable to at least PUSCH transmissions scheduled by DCI format 0_1 or 0_2 in PDCCH with CRC scrambled with C-RNTI, MCS-C-RNTI, or CS-RNTI with NDI=1. This feature is also referred to as dynamic waveform switching (DWS).

DWS feature may be configured separately for each BWP, within PUSCH-Config information element. DWS feature is enabled for each BWP by configuring a dynamic transform precoder indication (DTPI) information element (e.g., dynamicTransformPrecoderIndicationDCI-0-1 in pusch-Config for DCI format 0_1 or dynamicTransformPrecoder-IndicationDCI-0-2 in pusch-Config for DCI format 0_2) and setting the DTPI information element to enable. When the DWS feature is enabled for a BWP, any DCI that schedules a PUSCH transmission in the BWP is expected to contain a transform precoder indicator field which indicate a state of transform precoder (or a waveform) for the PUSCH transmission. The transform precoder indicator field value sets to 0 indicating transform precoder is enabled (or DFT-s-OFDM is used) for the PUSCH transmission. The transform precoder indicator field value sets to 1 indicating transform precoder is disabled (or CP-OFDM is used) for the PUSCH transmission.

Regarding resource allocation in the frequency domain, three uplink resource allocation schemes type 0, type 1 and type 2 may be supported, wherein resource allocation type 0 allows a discontinuous allocation of resources in frequency domain, which is not supported by DFT-s-OFDM waveform by design (i.e., not supported when transform precoder is enabled). In other words, uplink resource allocation scheme type 0 is supported for PUSCH only when transform precoding is disabled. Uplink resource allocation scheme type 1 and type 2 are supported for PUSCH for both cases when transform precoding is enabled or disabled. If the scheduling DCI is configured to indicate the uplink resource allocation type as part of the “Frequency domain resource” assignment field by setting a higher layer parameter resourceAllocation in pusch-Config to “dynamicSwitch”, for DCI format 0_1 or setting a higher layer parameter resourceAllocationDCI-0-2 in pusch-Config to ‘dynamicSwitch’ for DCI format 0_2, the UE shall use uplink resource allocation type 0 or type 1 as defined by the most significant bit of this DCI field. Otherwise, the UE shall use the uplink frequency resource allocation type as defined by the higher layer parameter resourceAllocation for DCI format 0_1 or the higher layer parameter resourceAllocationDCI-0-2 for DCI format 0_2.

FIG. 1 illustrates an example of BWP switching with DWS. As shown in FIG. 1, there is a switching between two BWPs including BWP_1 102 and BWP_2 104. The BWP_1 102 represents the active BWP and the BWP_2 104 represents the indicated one with the DWS feature enabled. For this BWP switching to happen, a DCI format 0_1 or a DCI format 0_2 was received in the active BWP (for example BWP_1 102) with a bandwidth part indicator (BPI) which indicates a BWP switching from the BWP_1 102 to the BWP_2 104, and the DCI format 0_1 or the DCI format 0_2 schedules a PUSCH transmission in BWP_2.

It appears in FIG. 1 that the BWP_2 104 is configured with DWS feature (i.e., the dynamic transform precoder indication information element is configured and set to enabled for the BWP_2). It is assumed in FIG. 1 that the received DCI transform precoder field also contains a transform precoder indicator field that indicates enabling of transform precoder (i.e., DFT-s-OFDM waveform) for the scheduled PUSCH along with BWP switching. In addition, it is assumed that the resourceAllocation parameter is configured as dynamicSwitch in the BWP_2 104 and the bit-width of the FDRA field for BWP_1 (FDRA_1) is smaller than the bit-width of the FDRA field for BWP_2 (FDRA_2). In this context, a UE may determine that both DFT-s-OFDM (as indicated by the DCI) and resource allocation (RA) type 0 (as determined based on the conditions that resourceAllocation parameter is configured as dynamicSwitch in the BWP_2 104 and FDRA_1<FDRA2) This scenario is not currently supported and the above would thus cause problems between the UE and the gNB.

It may be argued that the gNB could avoid setting transform precoder indicator field value to 0 (i.e., indicating DFT-s-OFDM) when knowing that the indicated BWP (for example, the BWP_2 104) is configured with dynamicSwitch in resourceAllocation and FDRA_1<FDRA_2. However, this may be unavoidable in the scenario when the DWS feature is not enabled (i.e., when a DTPI information element is not configured or is configured and set to disabled) in the active BWP (for example, the BWP_1 102) and it is enabled (i.e., when a DTPI information element is configured and set to enabled) in the indicated BWP (for example, the BWP_2 104). Indeed, based on TS 38.213, the UE may prepend “0” to the transform precoder indicator field of the DCI indicating BWP switching in this scenario, which is then interpreted by the UE itself as an indication for enabling transform precoder (or to use DFT-s-OFDM).

Some example embodiments of the present disclosure propose a scheme for bandwidth part switching. With this scheme, if a dynamic transform precoder indication (DTPI) information element is configured and set to enabled for a first BWP, a DTPI information element is configured and set to enabled for a second BWP, a bit-width of a frequency domain resource assignment (FDRA) field for the first BWP is smaller than a bit-width of an FDRA field for the second BWP, and dynamic switching is configured in a resource allocation information element for the second BWP, a first apparatus (such as a UE) is to switch from the first BWP to the second BWP. The first apparatus receives from a second apparatus (such as a gNB) a DCI message in the first BWP which schedules a physical uplink shared channel (PUSCH) transmission and indicates the first apparatus to perform the transmission on the second BWP. The DCI message further includes a transform precoder indicator field set to 1.

In this case, with these constraints such as the condition and the information included in the DCI message, the BWP switching may be more efficient.

Some example embodiments of the present disclosure propose another scheme for bandwidth part switching. With this scheme, after the first apparatus receives the DCI message in the first BWP, based on at least one condition related to at least enabling of a dynamic transform precoder indication (DTPI) information element configured for the second BWP, the first apparatus determines at least one of a resource allocation type or a state of transform precoder for the PUSCH transmission to the second apparatus on the second BWP.

In this case, based on one or more conditions related to at least enabling of DWS for the second BWP, the BWP switching may be more efficient.

Figure 2:
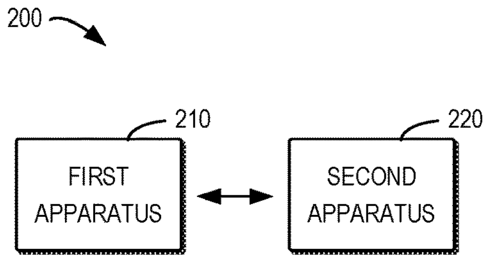
FIG. 2 illustrates an example communication environment in which example embodiments of the present disclosure can be implemented.

FIG. 2 illustrates an example communication environment 200 in which example embodiments of the present disclosure can be implemented.

As shown in FIG. 2, the communication environment 200 comprises a first apparatus 210 which may operate as a terminal device such as a UE. The first apparatus 210 may communicate with a second apparatus 220 which may operate as a network device such as a gNB.

It is to be understood that the number and types of devices are shown in FIG. 2 for the purpose of illustration without suggesting any limitation. For example, only for illustration, the first apparatus 210 is shown to be physically separate from the second apparatus 220. In some example embodiments, the first apparatus 210 may be collocated with the second apparatus 220 or physically integrated into or implemented as a part of the second apparatus 220.

In some example embodiments, a link from the second apparatus 220 to the first apparatus 210 may be referred to as a downlink, and a link from the first apparatus 210 to the second apparatus 220 may be referred to as an uplink. In DL, the second apparatus 220 is a transmitting (TX) device (or a transmitter) and the first apparatus 210 is a receiving (RX) device (or a receiver). In UL, the first apparatus 210 is a TX device (or a transmitter) and the second apparatus 220 is an RX device (or a receiver).

In the following, for the purpose of illustration, some example embodiments are described with the first apparatus 210 operating as a terminal device and the second apparatus 220 operating as a network device. However, in some example embodiments, operations described in connection with a terminal device may be implemented at a network device or other device, and operations described in connection with a network device may be implemented at a terminal device or other device.

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiplexing (OFDM), Cyclic Prefix OFDM (CP-OFDM), Discrete Fourier Transform spread OFDM (DFT-s-OFDM) and/or any other technologies currently known or to be developed in the future.

In the environment, some proposed rules may be applied for the DWS indication for the indicated BWP in the case of BWP switching, for example, aiming at preventing the use of RA type 0 together with DFT-s-OFDM. In some example embodiments, the second apparatus 220 may apply some rules to the DWS indication for the indicated BWP. Some example implementations in this regard will be described below with reference to FIG. 3.

Figure 3:
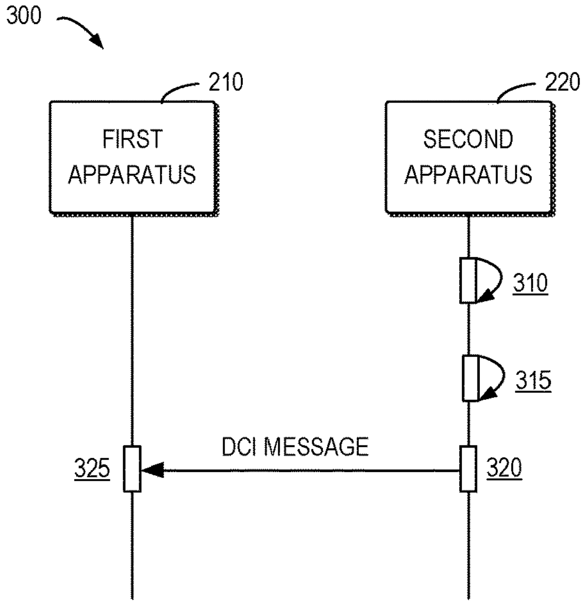
FIG. 3 illustrates a signaling diagram for an example communication process in the communication environment according to some example embodiments of the present disclosure.

FIG. 3 illustrates a signaling diagram for an example communication process 300 in the communication environment 200 according to some example embodiments of the present disclosure.

As shown in FIG. 3, the second apparatus 220 may determine (310) a candidate second BWP for the first apparatus 210.

Based on a first condition being met, the second apparatus 220 may determine (315) that the first apparatus 210 is to switch from a first BWP to the second BWP. The firsts condition comprises at least one of: a condition that DTPI information element is configured and set to be enabled for the first BWP, a condition that DTPI information element is configured and set to be enabled for the second BWP, a condition that a bit-width of a FDRA field for the first BWP is smaller than a bit-width of an FDRA field for the second BWP, or a condition that dynamic switching is configured in a resource allocation information element for the second BWP.

Then, the second apparatus 220 may transmit (320) a DCI message in the first BWP to the first apparatus 210. The DCI message schedules a physical uplink shared channel (PUSCH) transmission and indicates to perform the transmission on the second BWP, and the DCI message further includes a transform precoder indicator field set to 1. Correspondingly, the first apparatus 210 may receive (325) the DCI message based on the condition being met.

In some example embodiments, the DTPI information element for a BWP indicates that DCI messages used to schedule a PUSCH transmission on a BWP include a transform precoder indicator field.

In some example embodiments, the second apparatus 220 may determine a candidate third BWP for the first apparatus. Based on a further condition being met, the second apparatus 220 may determine the candidate second BWP for the first apparatus 210. The further condition includes at least one of: a condition that the DTPI information element is configured and set to disabled or not configured for the first BWP; a condition that the DTPI information element is configured and set to be enabled for the third BWP; a condition that resource allocation type 0 is configured in a resource allocation information element for the third BWP; a condition that the bit-width of the FDRA field for the first BWP is smaller than a bit-width of an FDRA field for the third BWP; or a condition that dynamic switching is configured in a resource allocation information element for the third BWP.

In some example embodiments, based on a second condition being met, the first apparatus 210 considers a received DCI message in a first BWP as invalid. The second condition comprises at least one of: a condition that a DTPI information element is not configured or is configured and set to disabled for the first BWP, a condition that a DTPI information element is configured and set to enabled for the second BWP, a condition that resource allocation type 0 is configured in a resource allocation information element for the second BWP, a condition that dynamic switching is configured in a resource allocation information element for the second BWP, a condition that a bit-width of an FDRA field for the first BWP is smaller than a bit-width of an FDRA field for the second BWP in the DCI message, or a condition that the DCI message includes a transform precoder indicator field set to 0.

For example, if DWS feature is enabled for an indicated BWP and if the bit-width of the FDRA field of the active BWP is smaller than the bit-width of the FDRA field of the indicated BWP, and the resourceAllocation parameter in the indicated BWP is configured to dynamicSwitch, the UE does not expect the Transform precoder indicator field of the scheduling DCI to be set to 0.

In some example embodiments, the first apparatus 210 may apply some proposed rules to the DWS indication for the indicated BWP. Some example implementations in this regard will be described below with reference to FIG. 4.

Figure 4:
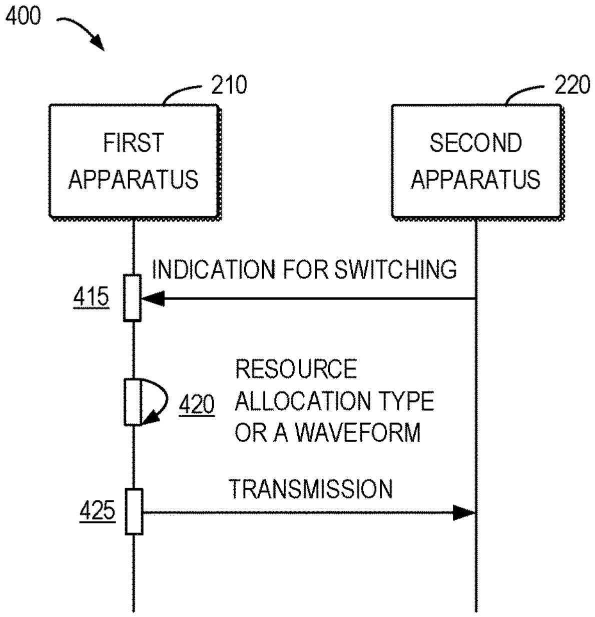
FIG. 4 illustrates a signaling diagram for an example communication process in the communication environment according to some example embodiments of the present disclosure.

FIG. 4 illustrates a signaling diagram for an example communication process 400 in the communication environment 200 according to some example embodiments of the present disclosure.

As shown in FIG. 4, the first apparatus 210 may receive (415) a DCI message in the first BWP. The DCI message schedules a physical uplink shared channel (PUSCH) transmission and indicates to perform the transmission on the second BWP.

Based on at least one condition related to at least enabling of DTPI information element configured for the second BWP, the first apparatus 210 may determine (420) at least one of a resource allocation type or a state of transform precoder for the PUSCH transmission such as a waveform.

Then, the first apparatus 210 may perform (425) the PUSCH transmission to a second apparatus on the second BWP using the at least one of the resource allocation type or the state of transform precoder for the PUSCH transmission.

In some example embodiments, based on determining that a transform precoder indicator field for the second BWP is present in the DCI message, the first apparatus 210 may determine that a transform precoder indicator field is present in the DCI message.

In some example embodiments, the at least one condition is further related to at least one of a comparison of a bit-width of a frequency domain resource assignment (FDRA) field of the first BWP and a bit-width of an FDRA field of the second BWP, a resource allocation information element of the second BWP, or enabling of a DTPI information element configured for the first BWP.

In some example embodiments, based on a first condition of the at least one condition being met, the first apparatus 210 may determine that the resource allocation type is resource allocation type 1. The first condition comprises at least one of: a condition that the DTPI information element is configured and set to be enabled for the second BWP, a condition that the bit-width of the FDRA field of the first BWP is smaller than the bit-width of the FDRA field of the second BWP, or a condition that the resource allocation information element of the second BWP indicates dynamic switching.

In some example embodiments, based on a second condition of the at least one condition being met, the first apparatus 210 may determine that the resource allocation type is resource allocation type 2. The second condition comprises at least one of: a condition that the DTPI information element is configured and set to disabled or not configured for the second BWP, a condition that the bit-width of the FDRA field of the first BWP is smaller than the bit-width of the FDRA field of the second BWP, or a condition that the resource allocation information element of the second BWP indicates dynamic switching.

In some example embodiments, based on a third condition of the at least one condition being met, the first apparatus 210 may determine that the state of transform precoder for the PUSCH transmission is set to disabled. The third condition comprises at least one of: a condition that the DTPI information element is configured and set to be enabled for the second BWP, the DTPI information element is not configured or is configured and set to be disabled for the first BWP, a condition that the bit-width of the FDRA field of the first BWP is smaller than the bit-width of the FDRA field of the second BWP, or a condition that the resource allocation information element of the second BWP indicates dynamic switching.

In some example embodiments, based on a fourth condition of the at least one condition being met, the first apparatus 210 may determine the state of transform precoder for the PUSCH transmission based on a transform precoder indicator field for the second BWP in the DCI message. The fourth condition comprises at least one of: a condition that the DTPI information element is configured and set to be enabled for the second BWP, a condition that the DTPI information element is configured and set to be enabled for the first BWP, a condition that the bit-width of the FDRA field of the first BWP is smaller than the bit-width of the FDRA field of the second BWP, or a condition that the resource allocation information element of the second BWP indicates dynamic switching.

In some example embodiments, based on a fifth condition of the at least one condition being met, the first apparatus 210 may determine the state of transform precoder for the PUSCH transmission based on a transform precoder information element configured for the second BWP. The fifth condition comprises at least one of: a condition that the DTPI information element is not configured or is configured and set to be for the second BWP, a condition that the bit-width of the FDRA field of the first BWP is smaller than the bit-width of the FDRA field of the second BWP, or a condition that the resource allocation information element of the second BWP indicates dynamic switching.

In some example embodiments, based on a sixth condition of the at least one condition being met, the first apparatus 210 may determine the state of transform precoder for the PUSCH transmission based on a transform precoder information element configured for the second BWP. The sixth condition comprises at least one of: a condition that the DTPI information element is configured and set to be enabled for the second BWP, a condition that the DTPI information element is not configured or is configured and set to be disabled for the first BWP, a condition that the bit-width of the FDRA field of the first BWP is smaller than the bit-width of the FDRA field of the second BWP, or a condition that the resource allocation information element of the second BWP indicates dynamic switching.

In some example embodiments, based on the sixth condition being met, the first apparatus 210 may ignore a transform precoder indicator field for the second BWP in the DCI message.

In some example embodiments, based on a seventh condition of the at least one condition being met, the first apparatus 210 may determine the state of transform precoder for the PUSCH transmission based on the transform precoder indicator field in the DCI message. The seventh condition comprises at least one of: a condition that a DTPI information element is configured and set to be enabled for the first BWP; a condition that the DTPI information element is configured and set to be enabled for the second BWP; or a condition that a cyclic redundancy check (CRC) sequence of the DCI message is scrambled by a configured scheduling radio network temporary identifier and a new data indicator field in the DCI message is set to one.

In some example embodiments, based on an eight condition of the at least one condition being met, the first apparatus 210 may determine that the transform precoder indicator field in the DCI message is ignored by the first apparatus 210. The eight condition comprises at least one of: a condition that a DTPI information element is configured and set to be enabled for the first BWP; a condition that the DTPI information element is configured and set to be enabled for the second BWP; or a condition that a cyclic redundancy check (CRC) sequence of the DCI message is scrambled by a configured scheduling radio network temporary identifier (CS-RNTI) and a new data indicator (NDI) field in the DCI message is set to zero.

In some example embodiments, based on the eight condition of the at least one condition being met, the first apparatus 210 may determine the state of transform precoder for the PUSCH transmission based on a transform precoder information element configured for the second BWP.

In some example embodiments, the first apparatus 210 may determine that the first BWP is identical to the second BWP. For example, the first apparatus 210 determines waveform using RRC if CRC of the DCI is scrambled by CS-RNTI and NDI=0. The first apparatus 210 ignores the TPI field in this case. UE determines waveform using the TPI field if CRC is scrambled by CS-RNTI and NDI=1.

In some example embodiments, the transform precoder information element for the second BWP is configured by an RRC message. In some example embodiments, the resource allocation information element is configured by an RRC message. In some example embodiments, the DTPI information element for the first BWP and the DTPI information element for the second BWP are configured by an RRC message.

In an example, if the DWS feature is enabled for an indicated BWP and if the bit-width of the FDRA field of the active BWP is smaller than the bit-width of the FDRA field of the indicated BWP, and the resource Allocation parameter in the indicated BWP is configured to dynamicSwitch, the UE may assume cation type 1 is applied for the PUSCH transmission(s) scheduled by the DCI that indicates the switching to the indicated BWP.

Alternatively, or additionally, the UE may fallback to RA type 0 in case of BWP switching (as per current the third generation partnership project (3GPP) standards) if and only if the "dynamic transform precoder indicator" field is not present for the indicated BWP, such as the DWS feature is not enabled.

For example, for DCI format 0_1, if "Bandwidth part indicator" field indicates a bandwidth part other than the active bandwidth part and if resourceAllocation is configured as "dynamicSwitch" and dynamicTransformPrecoderIndicationDCI-0-1 is set to "disabled" or not configured for the indicated bandwidth part, the UE assumes resource allocation type 0 for the indicated bandwidth part if the bit-width of the "frequency domain resource assignment" field of the active bandwidth part is smaller than the bit-width of the "frequency domain resourceassignment" field of the indicated bandwidth part.

For DCI format 0_2, if the "Bandwidth part indicator" field indicates a bandwidth part other than the active bandwidth part and if resourceAllocationDCI-0-2-r16 is configured as "dynamicSwitch" and dynamicTransformPrecoderIndicationDCI-0-2 is set to "disabled" or not configured for the indicated bandwidth part, the UE may assume resource allocation type 0 for the indicated bandwidth part if the bit-width of the "frequency domain resource assignment" field of the active bandwidth part is smaller than the bit-width of the "frequency domain resource assignment" field of the indicated bandwidth part.

In some example embodiments, the first apparatus 210 may determine a reference BWP either configured by the second apparatus 220 or a network (NW) or given by a rule in the 3GPP standards (e.g., reference BWP is the initial BWP), and the NW ensures that bit-width of the FDRA field of the reference BWP is always greater than or equal to bit-width of the FDRA field of any other configured BWP with resourceAllocation parameter configured to dynamicSwitch and DWS feature enabled.

This can be done by, e.g., configuring a reference BWP that is larger than any other BWP with a same RBG size for all BWPs. For switching back from any other BWP to the reference BWP, some alternatives can be considered. In an example, the first apparatus 210 does not expect that resourceAllocation parameter configured to dynamicSwitch and DWS feature enabled for the reference BWP. It is to be noted that this constraint makes sure that there is no issue for dynamically switching from any BWP to the reference BWP. In an alternative example, the NW configures a timer, such that after expiration of the timer, the first apparatus 210 falls back to the reference BWP. The NW can freely configure DWS and dynamicSwitch in resourceAllocation in this alternative.

In this case, if the NW anticipates that there is issue switching from a first BWP to a second BWP (neither of them is the reference BWP), the NW can switch from the first BWP to the reference BWP and then from the reference BWP to the second BWP.

Figure 5:
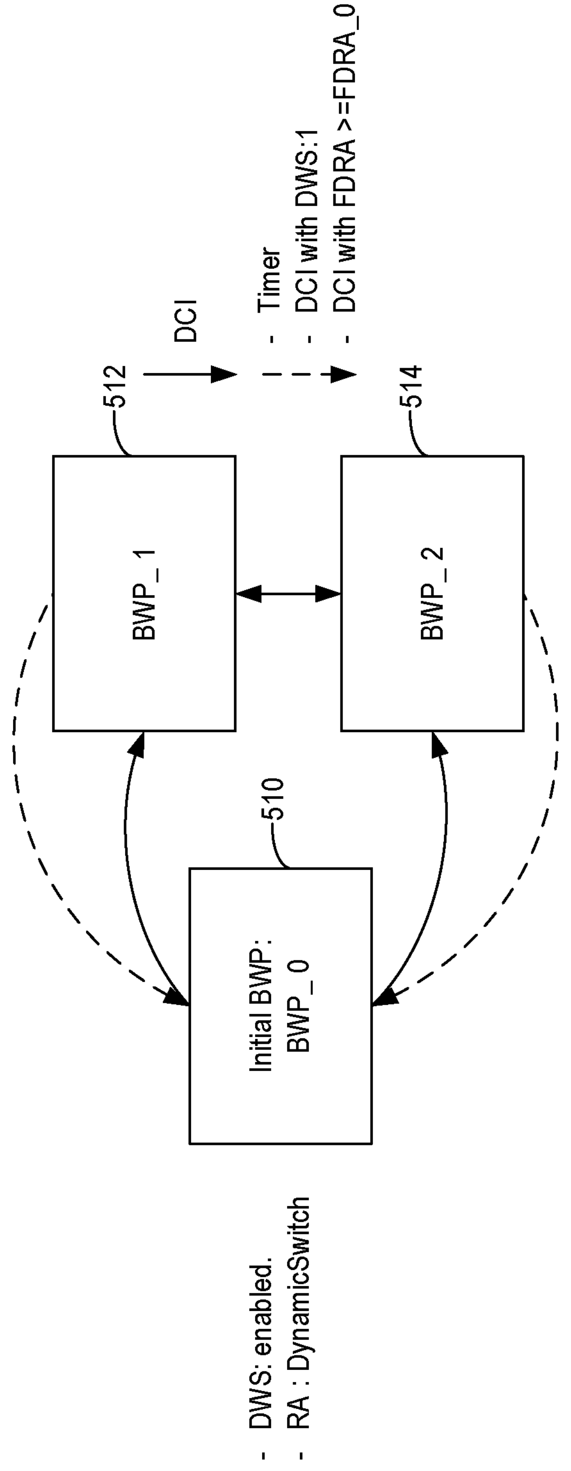
FIG. 5 illustrates an example diagram of BWP switching possibilities according to some embodiments of the present disclosure.

FIG. 5 illustrates an example diagram of BWP switching possibilities according to some embodiments of the present disclosure.

As shown in FIG. 5, an initial BWP 510 which is represented by BWP_0, and there are several BWP switching possibilities for the initial BWP 510 to switch. For example, the initial BWP 510 may switch to BWP_1 512, or BWP_2 514. In addition, if the BWP_1 512 is to switch to the BWP_2 514, the BWP_1 512 may first switch to the initial BWP 510 and the initial BWP 510 may then switch to the BWP_2 514; and vice versa.

Some example embodiments of the DWS indication for the indicated BWP in the case of BWP switching will be described below with reference to FIGS. 6 to 8. In these example embodiments, a UE is an example implementation of the first apparatus 210 and a NW performs the function of the second apparatus 220

Example Embodiment 1

Figure 6:
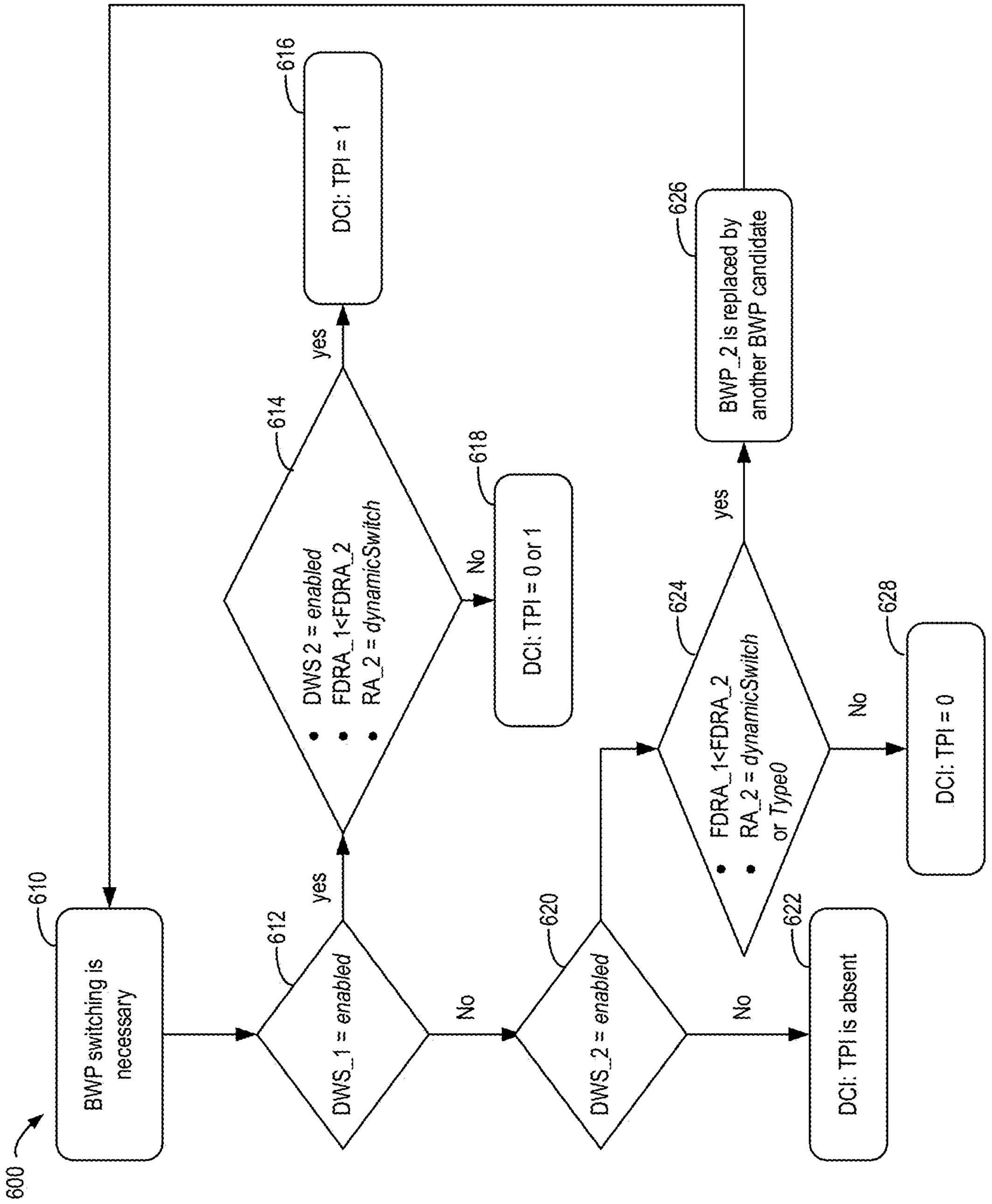
FIG. 6 illustrates a flowchart of an example process for BWP switching according to some embodiments of the present disclosure.

FIG. 6 illustrates a flowchart of an example process 600 for BWP switching according to some embodiments of the present disclosure.

In the process 600, the NW may indicate information including multiple BWPs, and the UE may receive it via RRC configuration. At least one BWP is configured such that DWS feature is enabled and resourceAllocation parameter is set to dynamicSwitch in the BWP.

At 610, the NW may determine that there is a need for switching from a first BWP (which may be an active BWP) to a second BWP (which may be an indicated BWP).

At 612, the NW may determine whether the DWS feature is enabled in the first BWP. If the DWS feature is enabled in the first BWP, 614 is performed, otherwise 620 is performed.

At 614, if the DWS feature is enabled for the second BWP and if the bit-width of the FDRA field of the first BWP is smaller than the bit-width of the FDRA field of the second BWP, and the resourceAllocation parameter in the second BWP is configured to dynamicSwitch, then the NW may send a PDCCH with a DCI on the first BWP indicating a BWP switching to the second BWP and schedules a PUSCH transmission on the second BWP. In this case, at 616, the DCI includes a transform precoder indicator field set to 1 only.

At 618, Otherwise, if the DWS feature is not enabled for the second BWP and if the bit-width of the FDRA field of the first BWP is not smaller than the bit-width of the FDRA field of the second BWP, or the resource Allocation parameter in the second BWP is not configured to dynamicSwitch, the transform precoder indicator field may be set to either 0 or 1.

At 620, the NW may determine whether the DWS feature is disabled (or not configured) for the second BWP. If the DWS feature is disabled (or not configured) for the second BWP, 622 is performed, otherwise, 624 is performed.

At 622, the NW sends a PDCCH with a DCI on the first BWP indicating a BWP switching to the second BWP and schedules a PUSCH transmission on the second BWP (transform precoder indicator field may be not present in the DCI in this case).

At 624, the NW determines whether the bit-width of the FDRA field of the first BWP is smaller than the bit-width of the FDRA field of the second BWP, and the resource Allocation parameter in the second BWP is configured to dynamicSwitch, OR if the resourceAllocation parameter in the second BWP is configured to resourceAllocationType0. If so, 626 is performed, otherwise 628 is performed.

At 626, the NW does not send a PDCCH with a DCI on the first BWP indicating a BWP switching to the second BWP. The NW then determines another candidate for the second BWP and performs the process 600 again.

At 628, the NW sends a PDCCH with a DCI on the first BWP indicating a BWP switching to the second BWP and schedules a PUSCH transmission on the second BWP. The DCI includes a transform precoder indicator field set to 0 or does not include a transform precoder indicator field.

Furthermore, the UE may determine the second BWP and a waveform to be applied for the PUSCH transmission on the second BWP according to the transform precoder indicator field. The UE may transmit the PUSCH transmission on the second BWP using the determined waveform.

Example Embodiment 2

Figure 7:
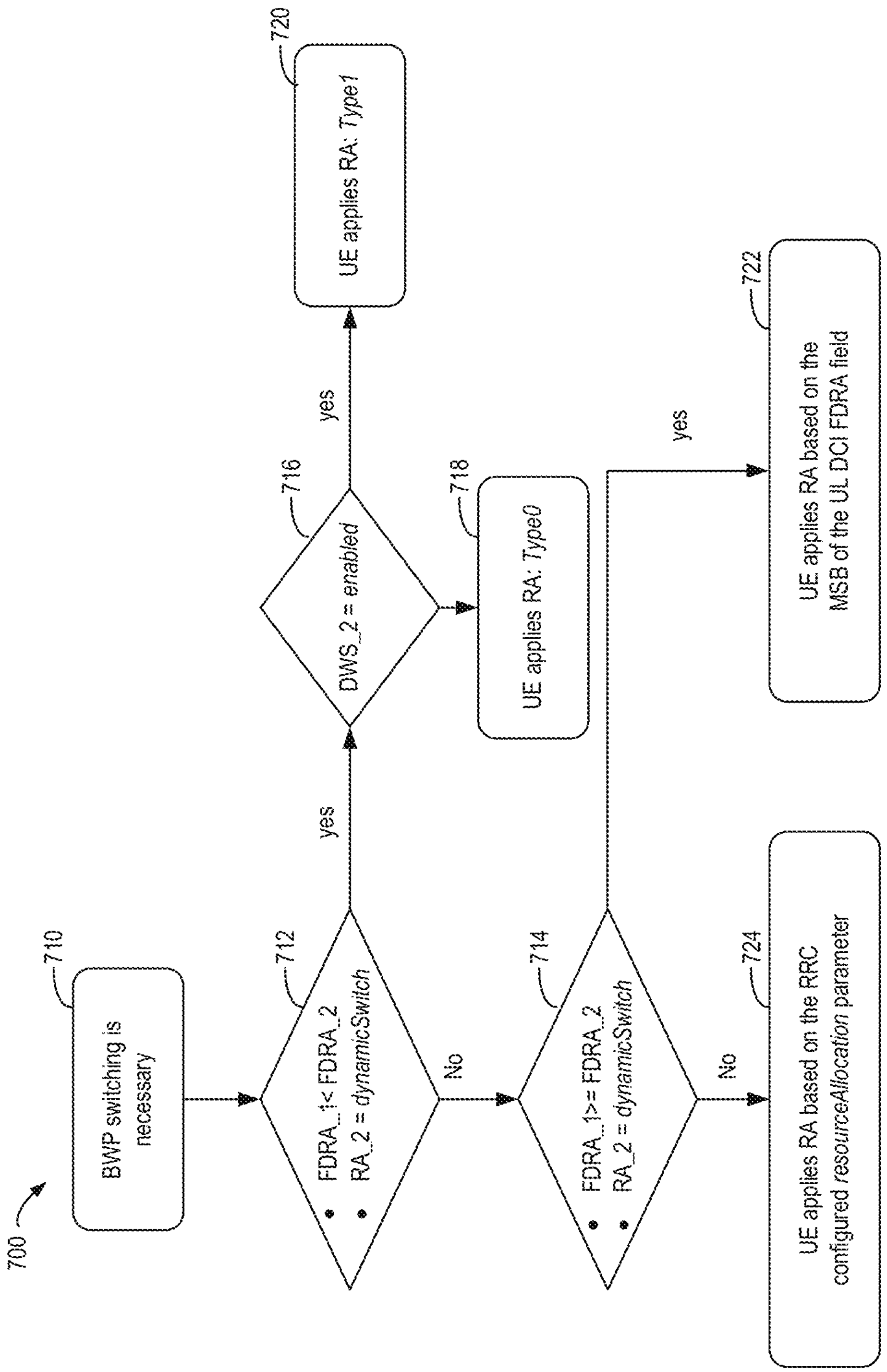
FIG. 7 illustrates a flowchart of an example process for BWP switching according to some embodiments of the present disclosure.

FIG. 7 illustrates a flowchart of an example process 700 for BWP switching according to some embodiments of the present disclosure.

In the process 700, the NW may indicate information including multiple BWPs, and the UE may receive it via RRC configuration. At least one BWP is configured such that DWS feature is enabled and resourceAllocation parameter is set to dynamicSwitch in the BWP.

At 710, the NW may determine that there is a need for switching from a first BWP (which may be an active BWP) to a second BWP (which may be an indicated BWP). The NW may send a PDCCH with a DCI on the first BWP indicating a BWP switching to the second BWP and schedules a PUSCH transmission on the second BWP.

In the following, the UE may determine a resource allocation type to be applied for the PUSCH transmission.

At 712, the NW may determine whether the bit-width of the FDRA field of the first BWP is smaller than the bit-width of the FDRA field of the second BWP, and the resourceAllocation parameter in the second BWP is configured to dynamicSwitch. If so, 714 is performed, otherwise 716 is performed.

At 714, the NW may determine whether the DWS feature is disabled or not configured for the second BWP. If the DWS feature is disabled or not configured for the second BWP, 718 is performed, otherwise 720 is performed.

At 718, the UE may apply resource allocation type 0 for the PUSCH transmission.

At 720, the UE may apply resource allocation type 1 for the PUSCH transmission.

At 716, the NW may determine whether the bit-width of the FDRA field of the first BWP is greater than or equal to the bit-width of the FDRA field of the second BWP, and the resource Allocation parameter in the second BWP is configured to dynamicSwitch. If so, 722 is performed, otherwise 724 is performed.

At 722, the UE may determine resource allocation type by the MSB of the bit sequence in the FDRA field of the DCI that is used for indicating the frequency resource for the PUSCH transmission.

At 724, the UE may determine resource allocation type from resourceAllocation parameter.

Furthermore, the UE may determine the second BWP and a state of transform precoder for the PUSCH transmission to be applied for the PUSCH transmission on the second BWP according to the transform precoder indicator field. The UE may transmit the PUSCH transmission on the second BWP using the determined state of transform precoder for the PUSCH transmission.

Example Embodiment 3

Figure 8:
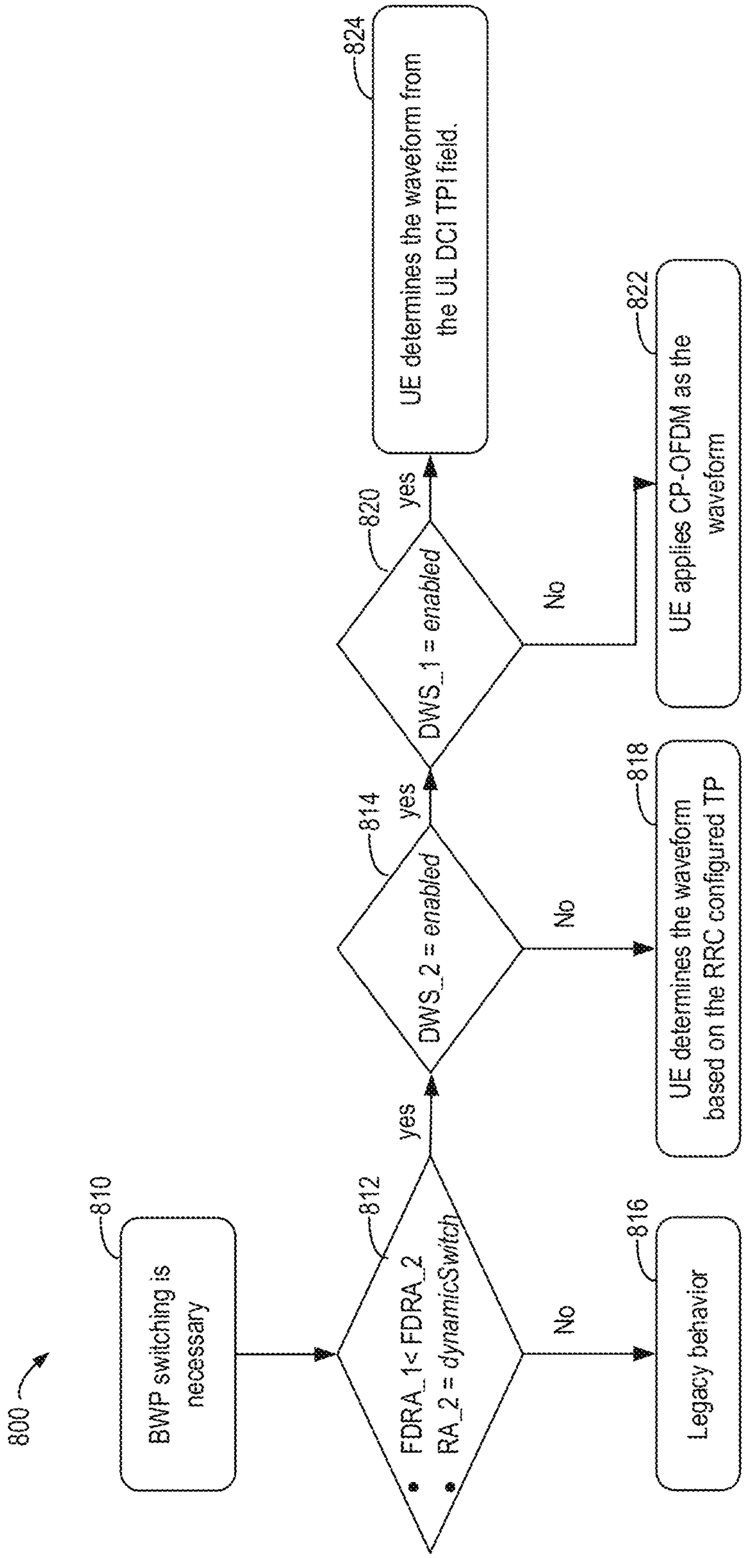
FIG. 8 illustrates a flowchart of an example process for BWP switching according to some embodiments of the present disclosure.

FIG. 8 illustrates a flowchart of an example process 800 for BWP switching according to some embodiments of the present disclosure.

In the process 800, the NW may indicate information including multiple BWPs, and the UE may receive it via the RRC configuration. The at least one BWP is configured such that DWS feature is enabled and resourceAllocation parameter is set to dynamicSwitch in the BWP.

As shown in FIG. 8, at 810, the NW may determine that there is a need for switching from a first BWP (which may be an active BWP) to a second BWP (which may be an indicated BWP). The NW may send a PDCCH with a DCI on the first BWP indicating a BWP switching to the second BWP and schedules a PUSCH transmission on the second BWP.

In the following the UE may determine the second BWP and a waveform to be applied for the PUSCH transmission.

At 812, the NW may determine whether the bit-width of the FDRA field of the first BWP is smaller than the bit-width of the FDRA field of the second BWP, and the resource Allocation parameter in the second BWP is configured to dynamicSwitch. If so, 814 is performed, otherwise 816 is performed.

At 814, the NW may determine whether the DWS feature is disabled or not configured for the second BWP. If so, 818 is performed, otherwise 820 is performed.

At 818, the UE may determine a waveform for the PUSCH transmission based on transformPrecoder parameter configured for the second BWP.

At 820, the NW may determine whether the DWS feature is disabled or not configured for the first BWP. If so, 822 is performed, otherwise 824 is performed.

At 822 the UE may ignore the transform precoder indicator field in the DCI and applies CP-OFDM waveform for the PUSCH transmission.

At 824, the UE may determine waveform for the PUSCH transmission from the transform precoder indicator field in the DCI.

Furthermore, the UE may transmit the PUSCH transmission on the second BWP using the determined waveform.

Example Embodiment 4

In the example embodiment 4, the NW may indicate information including multiple BWPs, and the UE may receive it via the RRC configuration. The at least one BWP is configured such that DWS feature is enabled and resource Allocation parameter is set to dynamicSwitch in the BWP.

Then, the NW may determine that there is a need for switching from a first BWP (which may be an active BWP) to a second BWP (which may be an indicated BWP). The NW may send a PDCCH with a DCI on the first BWP indicating a BWP switching to the second BWP and schedules a PUSCH transmission on the second BWP.

In addition, the UE may determine the second BWP and a waveform to be applied for the PUSCH transmission, wherein the latter may be determined based on the following:

If the DWS feature is enabled for the second BWP and if DWS feature is not enabled (or configured) for the first BWP, the UE may assume that the "dynamic transform precoder indicator" field is not present for the second BWP (for example, the DWS feature is not enabled for the second BWP). The UE may determine a waveform for the PUSCH transmissions based on the transformPrecoder parameter configured for the second BWP.

If the DWS feature is enabled for the second BWP and if the DWS feature is enabled (or configured) for the first BWP, the UE may determine a waveform to be applied for the PUSCH transmission on the second BWP according to the transform precoder indicator field.

If the DWS feature is not enabled for the second BWP, the UE may determine a waveform for the PUSCH transmissions based on the transformPrecoder parameter configured for the second BWP.

Furthermore, the UE may transmit the PUSCH transmission on the second BWP using the determined waveform.

In the example embodiment 4, if the "bandwidth part indicator" field indicates a bandwidth part other than the active bandwidth part and the "transform precoder indicator" field is present for the indicated bandwidth part, such as the DWS feature is enabled, but not present for the active bandwidth part, the UE may assume that the "transform precoder indicator" field is not present for the indicated bandwidth part, such as the DWS feature is not enabled (or configured).

The example embodiment 4 implicitly forces the UE using RRC configured waveform in such scenario.

Example Embodiment 5

In the example embodiment 5, the NW may indicate information including multiple BWPs, and the UE may receive it via the RRC configuration. The at least one BWP is configured such that the DWS feature is enabled and the resourceAllocation parameter is set to dynamicSwitch in the BWP. The indicated information may include a reference BWP from the multiple BWPs. The indicated information may include a timer, which starts when the BWP is switched from the reference BWP to another BWP. Upon expiration of the timer, the BWP is automatically switched back to the reference BWP (without indication via DCI).

The configuration of the multiple BWPs may comprise multiple conditions including the bit-width of the FDRA field of the reference BWP is always greater than or equal to the bit-width of the FDRA field of any other configured BWP with the resourceAllocation parameter configured to dynamicSwitch and the DWS feature enabled.

The condition may include that the reference BWP is not configured with the resourceAllocation parameter set to dynamicSwitch and the DWS feature enabled.

Then, the NW may determine that there is a need for switching from a first BWP (which may be an active BWP) to a second BWP (which may be an indicated BWP).

In an example, the NW may determine whether the second BWP is different from the reference BWP and if DWS feature is enabled for the second BWP and if the bit-width of the FDRA field of the first BWP is smaller than the bit-width of the FDRA field of the second BWP, and the resourceAllocation parameter in the second BWP is configured to dynamicSwitch. If so, the NW may send a PDCCH with a DCI on the first BWP indicating a BWP switching to the reference BWP. The NW may send a PDCCH with a DCI on the first BWP indicating a BWP switching to the second BWP and schedule a PUSCH transmission on the second BWP. Otherwise, the NW may send a PDCCH with a DCI on the first BWP indicating a BWP switching to the second BWP and schedule a PUSCH transmission on the second BWP.

In a further example, the NW may apply BWP switching after the timer expires. The first BWP may be a reference BWP. The NW may send a PDCCH with a DCI on the first BWP indicating a BWP switching to the second BWP and schedule a PUSCH transmission on the second BWP.

After that, in some example embodiments, the UE may determine that the first BWP is the reference BWP up on the expiration of the timer. The UE may determine the second BWP and a waveform to be applied for the PUSCH transmission on the second BWP according to the transform precoder indicator field.

Furthermore, the UE may transmit the PUSCH transmission on the second BWP using the determined waveform.

Example Methods

Figure 9A:
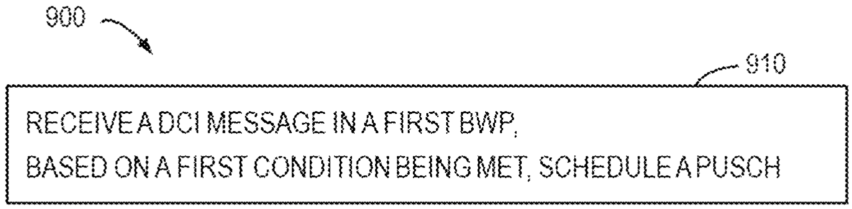
FIG. 9A illustrates a flowchart of a method implemented at a first device according to some example embodiments of the present disclosure.

FIG. 9A shows a flowchart of an example method 900 implemented at a first device in accordance with some example embodiments of the present disclosure. For the purpose of discussion, the method 900 will be described from the perspective of the first apparatus 210 in FIG. 2.

At block 910, the first apparatus 210 receives a downlink control information (DCI) message in a first bandwidth part (BWP). The DCI message schedules, based on a first condition being met, a physical uplink shared channel (PUSCH) transmission and indicates to perform the transmission on the second BWP. The first condition comprises at least one of: a condition that a dynamic transform precoder indication (DTPI) information element is configured and set to enabled for the first BWP, a condition that a DTPI information element is configured and set to enabled for the second BWP, a condition that a bit-width of a frequency domain resource assignment (FDRA) field for the first BWP is smaller than a bit-width of an FDRA field for the second BWP in the DCI message, a condition that dynamic switching is configured in a resource allocation information element for the second BWP, or a condition that the DCI message includes a transform precoder indicator field set to 1.

Figure 9B:
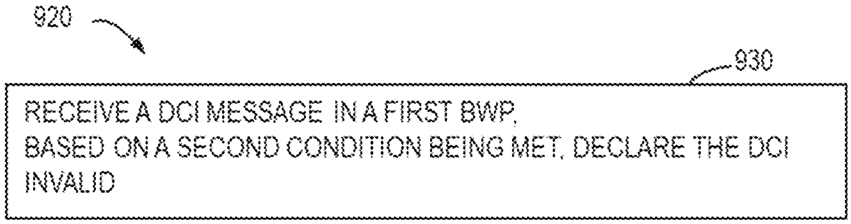
FIG. 9B illustrates a flowchart of a method implemented at a first device according to some example embodiments of the present disclosure.

In some example embodiments, as shown in an example method 920 of FIG. 9B, based on a second condition being met, the first apparatus 210 at 930 considers a received DCI message in a first BWP as invalid. The second condition comprises at least one of: a condition that a DTPI information element is not configured or is configured and set to disabled for the first BWP, a condition that a DTPI information element is configured and set to enabled for the second BWP, a condition that resource allocation type 0 is configured in a resource allocation information element for the second BWP, a condition that dynamic switching is configured in a resource allocation information element for the second BWP, a condition that a bit-width of a frequency domain resource assignment (FDRA) field for the first BWP is smaller than a bit-width of an FDRA field for the second BWP in the DCI message, or a condition that the DCI message includes a transform precoder indicator field set to 0.

In some example embodiments, the DTPI information element for a BWP indicates that DCI messages used to schedule a PUSCH transmission on a BWP include a transform precoder indicator field.

Figure 10:
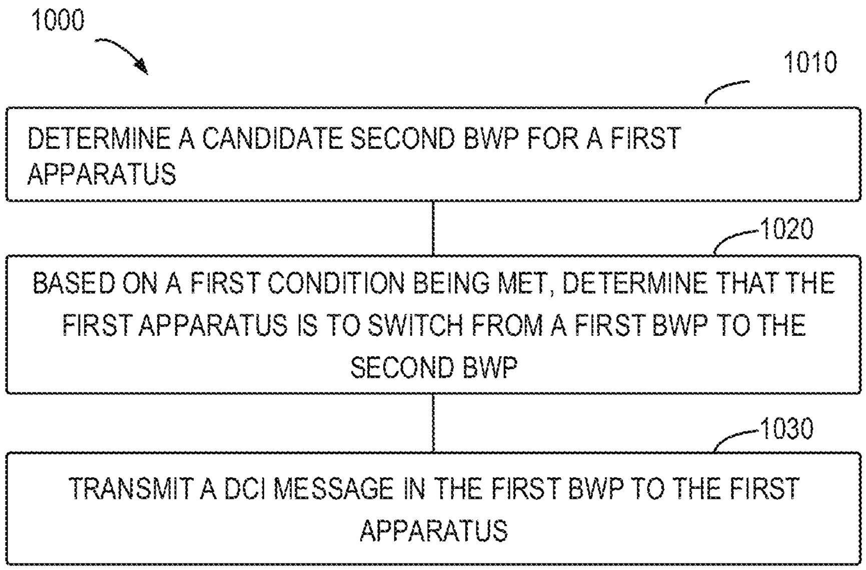
FIG. 10 illustrates a flowchart of a method implemented at a second device according to some example embodiments of the present disclosure.

FIG. 10 shows a flowchart of an example method 1000 implemented at a second device in accordance with some example embodiments of the present disclosure. For the purpose of discussion, the method 1000 will be described from the perspective of the second apparatus 220 in FIG. 2.

At block 1010, the second apparatus 220 determines a candidate second bandwidth part (BWP) for a first apparatus. At block 1020, based on a first condition being met, the second apparatus 220 determines that the first apparatus is to switch from a first BWP to the second BWP. The first condition comprises at least one of: a condition that a dynamic transform precoder indication (DTPI) information element is configured and set to be enabled for the first BWP, a DTPI information element is configured and set to be enabled for the second BWP, a bit-width of a frequency domain resource assignment (FDRA) field for the first BWP is smaller than a bit-width of an FDRA field for the second BWP, and dynamic switching is configured in a resource allocation information element for the second BWP.

At block 1030, the second apparatus 220 transmits a downlink control information (DCI) message in the first BWP to the first apparatus. The DCI message schedules a physical uplink shared channel (PUSCH) transmission and indicates to perform the transmission on the second BWP, and the DCI message includes a transform precoder indicator field set to 1.

In some example embodiments, the DTPI information element for a BWP indicates that DCI messages used to schedule a PUSCH transmission on a BWP include a transform precoder indicator field.

In some example embodiments, the second apparatus 220 determines a candidate third BWP for the first apparatus; and based on a further condition being met, determining the candidate second BWP for the first apparatus, wherein the further condition comprises at least one of: a condition that the DTPI information element is configured and set to be disabled or not configured for the first BWP, a condition that the DTPI information element is configured and set to be enabled for the third BWP, a condition that resource allocation type 0 is configured in a resource allocation information element for the third BWP, a condition that the bit-width of the FDRA field for the first BWP is smaller than a bit-width of an FDRA field for the third BWP, or a condition that dynamic switching is configured in a resource allocation information element for the third BWP.

Figure 11:
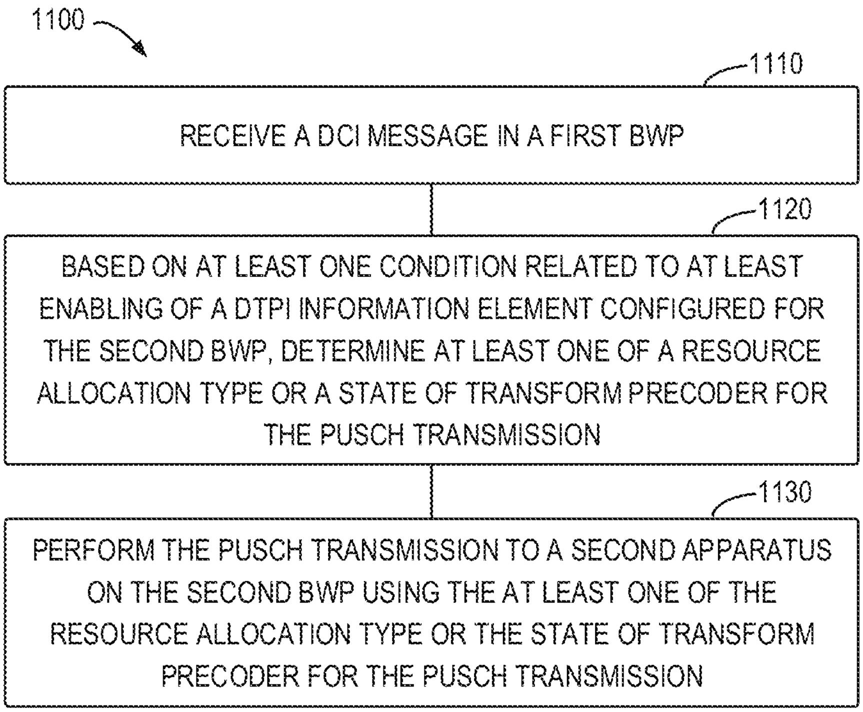
FIG. 11 illustrates a flowchart of a method implemented at a third device according to some example embodiments of the present disclosure.

FIG. 11 shows a flowchart of an example method 1100 implemented at a third device in accordance with some example embodiments of the present disclosure. For the purpose of discussion, the method 1100 will be described from the perspective of the first apparatus 210 in FIG. 2.

At block 1110, the first apparatus 210 receives a downlink control information (DCI) message in a first bandwidth part (BWP). The DCI message schedules a physical uplink shared channel (PUSCH) transmission and indicates to perform the transmission on a second BWP. At block 1120, based on at least one condition related to at least enabling of a dynamic transform precoder indication (DTPI) information element configured for the second BWP, the first apparatus 210 determines at least one of a resource allocation type or a state of transform precoder for the PUSCH transmission. At block 1130, the first apparatus 210 performs the PUSCH transmission to a second apparatus on the second BWP using the at least one of the resource allocation type or the state of transform precoder for the PUSCH transmission.

In some example embodiments, based on determining that the DTPI information element is configured and set to enable for the second BWP, the first apparatus 210 determines that a transform precoder indicator field is present in the DCI message.

In some example embodiments, the at least one condition is further related to at least one of a comparison of a bit-width of a frequency domain resource assignment (FDRA) field of the first BWP, a bit-width of an FDRA field of the second BWP, a resource allocation information element of the second BWP, or enabling of a DTPI information element configured for the first BWP.

In some example embodiments, based on a first condition of the at least one condition being met, the first apparatus 210 determines that the resource allocation type is resource allocation type 1. The first condition comprises at least one of: a condition that the DTPI information element is configured and set to enabled for the second BWP, a condition that the bit-width of the FDRA field of the first BWP is smaller than the bit-width of the FDRA field of the second BWP, or a condition that the resource allocation information element of the second BWP indicates dynamic switching.

In some example embodiments, based on a second condition of the at least one condition being met, the first apparatus 210 determines that the resource allocation type is resource allocation type 0. The second condition comprises at least one of: a condition that the DTPI information element is not configured or is configured and set to disabled for the second BWP, a condition that the bit-width of the FDRA field of the first BWP is smaller than the bit-width of the FDRA field of the second BWP, or a condition that the resource allocation information element of the second BWP indicates dynamic switching.

In some example embodiments, based on a third condition of the at least one condition being met, the first apparatus 210 determines that the state of transform precoder for the PUSCH transmission is set to disabled. The third condition comprises at least one of: a condition that the DTPI information element is configured and set to be enabled for the second BWP, a condition that the DTPI information element is not configured or is configured and set to be disabled for the first BWP, a condition that the bit-width of the FDRA field of the first BWP is smaller than the bit-width of the FDRA field of the second BWP, or a condition that the resource allocation information element of the second BWP indicates dynamic switching.

In some example embodiments, based on a fourth condition of the at least one condition being met, the first apparatus 210 determines the state of transform precoder for the PUSCH transmission based on the transform precoder indicator field in the DCI message. The fourth condition comprises at least one of: a condition that a condition that the DTPI information element is configured and set to enabled for the second BWP, a condition that the DTPI information element is configured and set to enabled for the first BWP, a condition that the bit-width of the FDRA field of the first BWP is smaller than the bit-width of the FDRA field of the second BWP, or a condition that the resource allocation information element of the second BWP indicates dynamic switching.

In some example embodiments, based on a fifth condition of the at least one condition being met, the first apparatus 210 determines the state of transform precoder for the PUSCH transmission based on a transform precoder information element configured for the second BWP. The fifth condition comprises at least one of: a condition that the DTPI information element is not configured or is configured and set to be disabled for the second BWP, a condition that the bit-width of the FDRA field of the first BWP is smaller than the bit-width of the FDRA field of the second BWP, or a condition that the resource allocation information element of the second BWP indicates dynamic switching.

In some example embodiments, based on a sixth condition of the at least one condition being met, the first apparatus 210 determines the state of transform precoder for the PUSCH transmission based on a transform precoder information element configured for the second BWP. The sixth condition comprises at least one of: a condition that the DTPI information element is configured and set to be enabled for the second BWP, a condition that the DTPI information element is not configured or is configured and set to be disabled for the first BWP, a condition that the bit-width of the FDRA field of the first BWP is smaller than the bit-width of the FDRA field of the second BWP, or a condition that the resource allocation information element of the second BWP indicates dynamic switching.

In some example embodiments, based on the sixth condition being met, the first apparatus 210 ignores the transform precoder indicator field in the DCI message.

In some example embodiments, based on a seventh condition of the at least one condition being met, the first apparatus 210 may determine the state of transform precoder for the PUSCH transmission based on the transform precoder indicator field in the DCI message. The seventh condition comprises at least one of: a condition that a DTPI information element is configured and set to be enabled for the first BWP; a condition that the DTPI information element is configured and set to be enabled for the second BWP; or a condition that a cyclic redundancy check (CRC) sequence of the DCI message is scrambled by a configured scheduling radio network temporary identifier and a new data indicator field in the DCI message is set to one.

In some example embodiments, based on an eight condition of the at least one condition being met, the first apparatus 210 may determine that the transform precoder indicator field in the DCI message is ignored by the first apparatus. The eight condition comprises at least one of: a condition that a DTPI information element is configured and set to be enabled for the first BWP; a condition that the DTPI information element is configured and set to be enabled for the second BWP; or a condition that a cyclic redundancy check (CRC) sequence of the DCI message is scrambled by a configured scheduling radio network temporary identifier (CS-RNTI) and a new data indicator (NDI) field in the DCI message is set to zero.

In some example embodiments, based on the eight condition of the at least one condition being met, the first apparatus 210 may determine the state of transform precoder for the PUSCH transmission based on a transform precoder information element configured for the second BWP.

In some example embodiments, the first apparatus 210 may determine that the first BWP is identical to the second BWP.

In some example embodiments, the transform precoder information element for the second BWP is configured by a radio resource control (RRC) message.

In some example embodiments, the resource allocation information element is configured by a radio resource control (RRC) message.

In some example embodiments, the DTPI information element for the first BWP and the DTPI information element for the second BWP are configured by a radio resource control (RRC) message.

Example Apparatus, Device and Medium

In some example embodiments, a first apparatus capable of performing the method 900 (for example, the first apparatus 210 in FIG. 2) may comprise means for performing the respective operations of the method 900. The means may be implemented in any suitable form. For example, the means may be implemented in a circuitry or software module. The first apparatus may be implemented as or included in the first apparatus 210 in FIG. 2.

In some example embodiments, the first apparatus comprises means for based on a first condition being met, receiving a downlink control information (DCI) message in a first bandwidth part (BWP), wherein the DCI message schedules a physical uplink shared channel (PUSCH) transmission and indicates to perform the transmission on the second BWP, and wherein the first condition comprises at least one of: a condition that a dynamic transform precoder indication (DTPI) information element is configured and set to enabled for the first BWP, a condition that a DTPI information element is configured and set to enabled for the second BWP, a condition that a bit-width of a frequency domain resource assignment (FDRA) field for the first BWP is smaller than a bit-width of an FDRA field for the second BWP in the DCI message, a condition that dynamic switching is configured in a resource allocation information element for the second BWP, or a condition that the DCI message includes a transform precoder indicator field set to 1.

In some example embodiments, the first apparatus further comprises: means for based on a second condition being met, considering a received DCI message in the first BWP as invalid, wherein the second condition comprises at least one of: a condition that a DTPI information element is not configured or is configured and set to disabled for the first BWP, a condition that a DTPI information element is configured and set to enabled for the second BWP, a condition that resource allocation type 0 is configured in a resource allocation information element for the second BWP, a condition that dynamic switching is configured in a resource allocation information element for the second BWP, a condition that a bit-width of a frequency domain resource assignment (FDRA) field for the first BWP is smaller than a bit-width of an FDRA field for the second BWP in the DCI message, or a condition that the DCI message includes a transform precoder indicator field set to 0.

In some example embodiments, the DTPI information element for a BWP indicates that DCI messages used to schedule a PUSCH transmission on a BWP include a transform precoder indicator field.

In some example embodiments, the first apparatus further comprises means for performing other operations in some example embodiments of the method 900 or the first apparatus 210. In some example embodiments, the means comprises at least one processor; and at least one memory storing instructions that, when executed by the at least one processor, cause the performance of the first apparatus.

In some example embodiments, a second apparatus capable of performing the method 1000 (for example, the second apparatus 220 in FIG. 2) may comprise means for performing the respective operations of the method 1000. The means may be implemented in any suitable form. For example, the means may be implemented in a circuitry or software module. The second apparatus may be implemented as or included in the second apparatus 220 in FIG. 2.

In some example embodiments, the second apparatus comprises means for determining a candidate second bandwidth part (BWP) for a first apparatus; means for based on a first condition being met, determining that the first apparatus is to switch from a first BWP to the second BWP, wherein the first condition comprises at least one of: a condition that a dynamic transform precoder indication (DTPI) information element is configured and set to be enabled for the first BWP, a condition that a DTPI information element is configured and set to be enabled for the second BWP, a condition that a bit-width of a frequency domain resource assignment (FDRA) field for the first BWP is smaller than a bit-width of an FDRA field for the second BWP, or a condition that dynamic switching is configured in a resource allocation information element for the second BWP; and means for transmitting a downlink control information (DCI) message in the first BWP to the first apparatus, wherein the DCI message schedules a physical uplink shared channel (PUSCH) transmission and indicates to perform the transmission on the second BWP, and the DCI message includes a transform precoder indicator field set to 1.

In some example embodiments, the DTPI information element for a BWP indicates that DCI messages used to schedule a PUSCH transmission on a BWP include a transform precoder indicator field.

In some example embodiments, the second apparatus further comprises: means for determining a candidate third BWP for the first apparatus; and means for based on a further condition being met, determining the candidate second BWP for the first apparatus, wherein the further condition comprises at least one of: a condition that the DTPI information element is configured and set to be disabled or not configured for the first BWP, a condition that the DTPI information element is configured and set to be enabled for the third BWP, a condition that resource allocation type 0 is configured in a resource allocation information element for the third BWP, a condition that the bit-width of the FDRA field for the first BWP is smaller than a bit-width of an FDRA field for the third BWP, or a condition that dynamic switching is configured in a resource allocation information element for the third BWP.

In some example embodiments, the second apparatus further comprises means for performing other operations in some example embodiments of the method 1000 or the second apparatus 220. In some example embodiments, the means comprises at least one processor; and at least one memory storing instructions that, when executed by the at least one processor, cause the performance of the second apparatus.

In some example embodiments, a first apparatus capable of performing the method 1100 (for example, the first apparatus 210 in FIG. 2) may comprise means for performing the respective operations of the method 1100. The means may be implemented in any suitable form. For example, the means may be implemented in a circuitry or software module. The first apparatus may be implemented as or included in the first apparatus 210 in FIG. 2.

In some example embodiments, the first apparatus comprises means for receiving a downlink control information (DCI) message in a first bandwidth part (BWP), wherein the DCI message schedules a physical uplink shared channel (PUSCH) transmission and indicates to perform the transmission on a second BWP; means for based on at least one condition related to at least enabling of a dynamic transform precoder indication (DTPI) information element configured for the second BWP, determining at least one of a resource allocation type or a state of transform precoder for the PUSCH transmission; and means for performing the PUSCH transmission to a second apparatus on the second BWP using the at least one of the resource allocation type or the state of transform precoder for the PUSCH transmission.

In some example embodiments, the first apparatus further comprises: based on determining that the DTPI information element is configured and set to enable for the second BWP, determining that a transform precoder indicator field is present in the DCI message.

In some example embodiments, the at least one condition is further related to at least one of a comparison of a bit-width of a frequency domain resource assignment (FDRA) field of the first BWP and a bit-width of an FDRA field of the second BWP, a resource allocation information element of the second BWP, or enabling of a DTPI information element configured for the first BWP.

In some example embodiments, the first apparatus comprises: means for based on a first condition of the at least one condition being met, determining that the resource allocation type is resource allocation type 1, wherein the first condition comprises at least one of: a condition that the DTPI information element is configured and set to enabled for the second BWP, a condition that the bit-width of the FDRA field of the first BWP is smaller than the bit-width of the FDRA field of the second BWP, or a condition that the resource allocation information element of the second BWP indicates dynamic switching.

In some example embodiments, the first apparatus comprises: means for based on a second condition of the at least one condition being met, determining that the resource allocation type is resource allocation type 0, wherein the second condition comprises at least one of: a condition that the DTPI information element is not configured or is configured and set to disabled for the second BWP, a condition that the bit-width of the FDRA field of the first BWP is smaller than the bit-width of the FDRA field of the second BWP, or a condition that the resource allocation information element of the second BWP indicates dynamic switching.

In some example embodiments, the first apparatus comprises: means for based on a third condition of the at least one condition being met, determining that the state of transform precoder for the PUSCH transmission is set to disabled, wherein the third condition comprises at least one of: a condition that the DTPI information element is configured and set to be enabled for the second BWP, a condition that the DTPI information element is not configured or is configured and set to be disabled for the first BWP, a condition that the bit-width of the FDRA field of the first BWP is smaller than the bit-width of the FDRA field of the second BWP, or a condition that the resource allocation information element of the second BWP indicates dynamic switching.

In some example embodiments, the first apparatus comprises: means for based on a fourth condition of the at least one condition being met, determining the state of transform precoder for the PUSCH transmission based on the transform precoder indicator field in the DCI message, wherein the fourth condition comprises at least one of: a condition that the DTPI information element is configured and set to enabled for the second BWP, a condition that the DTPI information element is configured and set to enabled for the first BWP, a condition that the bit-width of the FDRA field of the first BWP is smaller than the bit-width of the FDRA field of the second BWP, or a condition that the resource allocation information element of the second BWP indicates dynamic switching.

In some example embodiments, the first apparatus comprises: means for based on a fifth condition of the at least one condition being met, determining the state of transform precoder for the PUSCH transmission based on a transform precoder information element configured for the second BWP, wherein the fifth condition comprises at least one of: a condition that the DTPI information element is not configured or is configured and set to be disabled for the second BWP, a condition that the bit-width of the FDRA field of the first BWP is smaller than the bit-width of the FDRA field of the second BWP, or a condition that the resource allocation information element of the second BWP indicates dynamic switching.

In some example embodiments, the first apparatus comprises: means for based on a sixth condition of the at least one condition being met, determining the state of transform precoder for the PUSCH transmission based on a transform precoder information element configured for the second BWP, wherein the sixth condition comprises at least one of: a condition that the DTPI information element is configured and set to be enabled for the second BWP, a condition that the DTPI information element is not configured or is configured and set to be disabled for the first BWP, a condition that the bit-width of the FDRA field of the first BWP is smaller than the bit-width of the FDRA field of the second BWP, or a condition that the resource allocation information element of the second BWP indicates dynamic switching.

In some example embodiments, the first apparatus further comprises: means for based on the sixth condition being met, ignoring the transform precoder indicator field in the DCI message.

In some example embodiments, the first apparatus further comprises: means for based on a seventh condition of the at least one condition being met, determining the state of transform precoder for the PUSCH transmission based on the transform precoder indicator field in the DCI message, wherein the seventh condition comprises at least one of: a condition that a DTPI information element is configured and set to be enabled for the first BWP; a condition that the DTPI information element is configured and set to be enabled for the second BWP; or a condition that a cyclic redundancy check (CRC) sequence of the DCI message is scrambled by a configured scheduling radio network temporary identifier and a new data indicator field in the DCI message is set to one.

In some example embodiments, the first apparatus further comprises: means for based on an eight condition of the at least one condition being met, determining that the transform precoder indicator field in the DCI message is ignored by the first apparatus, wherein the eight condition comprises at least one of: a condition that a DTPI information element is configured and set to be enabled for the first BWP; a condition that the DTPI information element is configured and set to be enabled for the second BWP; or a condition that a cyclic redundancy check (CRC) sequence of the DCI message is scrambled by a configured scheduling radio network temporary identifier (CS-RNTI) and a new data indicator (NDI) field in the DCI message is set to zero.

In some example embodiments, the first apparatus further comprises: means for based on the eight condition of the at least one condition being met, determining the state of transform precoder for the PUSCH transmission based on a transform precoder information element configured for the second BWP.

In some example embodiments, the first apparatus further comprises: means for determining that the first BWP is identical to the second BWP.

In some example embodiments, the transform precoder information element for the second BWP is configured by a radio resource control (RRC) message.

In some example embodiments, the resource allocation information element is configured by a radio resource control (RRC) message.

In some example embodiments, the DTPI information element for the first BWP and the DTPI information element for the second BWP are configured by a radio resource control (RRC) message.

In some example embodiments, the first apparatus further comprises means for performing other operations in some example embodiments of the method 1100 or the first apparatus 210. In some example embodiments, the means comprises at least one processor; and at least one memory storing instructions that, when executed by the at least one processor, cause the performance of the first apparatus.

Figure 12:
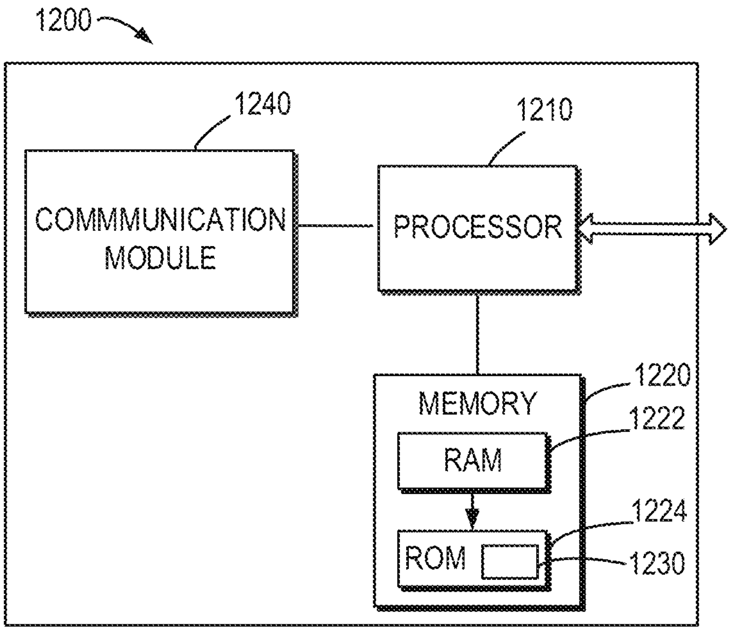
FIG. 12 illustrates a simplified block diagram of a device that is suitable for implementing example embodiments of the present disclosure.

FIG. 12 is a simplified block diagram of a device 1200 that is suitable for implementing example embodiments of the present disclosure. The device 1200 may be provided to implement a communication device, for example, the first apparatus 210 or the second apparatus 220 as shown in FIG. 2. As shown, the device 1200 includes one or more processors 1210, one or more memories 1220 coupled to the processor 1210, and one or more communication modules 1240 coupled to the processor 1210.

The communication module 1240 is for bidirectional communications. The communication module 1240 has one or more communication interfaces to facilitate communication with one or more other modules or devices. The communication interfaces may represent any interface that is necessary for communication with other network elements. In some example embodiments, the communication module 1240 may include at least one antenna.

The processor 1210 may be of any type suitable to the local technical network and may include one or more of the following: general purpose computers, special purpose computers, microprocessors, digital signal processors (DSPs) and processors based on multicore processor architecture, as non-limiting examples. The device 1200 may have multiple processors, such as an application specific integrated circuit chip that is slaved in time to a clock which synchronizes the main processor.

The memory 1220 may include one or more non-volatile memories and one or more volatile memories. Examples of the non-volatile memories include, but are not limited to, a Read Only Memory (ROM) 1224, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 1222 and other volatile memories that will not last in the power-down duration.

A computer program 1230 includes computer executable instructions that are executed by the associated processor 1210. The instructions of the program 1230 may include instructions for performing operations/acts of some example embodiments of the present disclosure. The program 1230 may be stored in the memory, e.g., the ROM 1224. The processor 1210 may perform any suitable actions and processing by loading the program 1230 into the RAM 1222.

The example embodiments of the present disclosure may be implemented by means of the program 1230 so that the device 1200 may perform any process of the disclosure as discussed with reference to FIG. 2 to FIG. 11. The example embodiments of the present disclosure may also be implemented by hardware or by a combination of software and hardware.

In some example embodiments, the program 1230 may be tangibly contained in a computer readable medium which may be included in the device 1200 (such as in the memory 1220) or other storage devices that are accessible by the device 1200. The device 1200 may load the program 1230 from the computer readable medium to the RAM 1222 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 13:
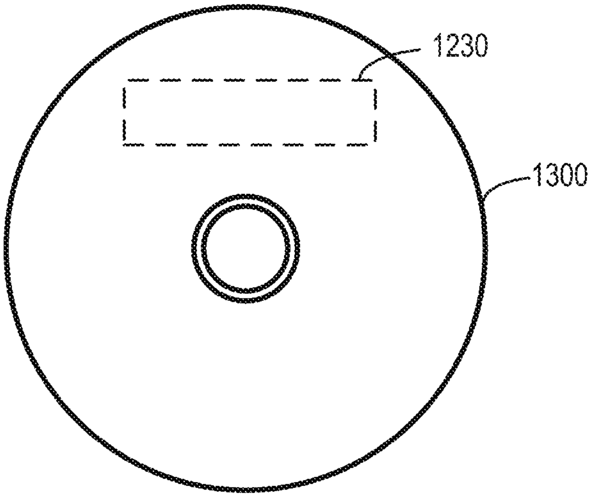
FIG. 13 illustrates a block diagram of an example computer readable medium in accordance with some example embodiments of the present disclosure.

FIG. 13 shows an example of the computer readable medium 1300 which may be in form of CD, DVD or other optical storage disk. The computer readable medium 1300 has the program 1230 stored thereon.

Generally, various embodiments of the present disclosure may be implemented in hardware or special purpose circuits, software, logic or any combination thereof. Some aspects may be implemented in hardware, and other aspects may be implemented in firmware or software which may be executed by a controller, microprocessor or other computing device. Although various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus comprising:

at least one processor; and at least one memory storing instructions that, when executed by the at least one processor, cause the apparatus at least to:

receive a downlink control information (DCI) message on a first bandwidth part (BWP), wherein the DCI message schedules, based on a first condition being met, a physical uplink shared channel (PUSCH) transmission and indicates to perform the transmission on a second BWP, and wherein the first condition comprises at least one of:

a condition that a dynamic transform precoder indication (DTPI) information element is configured and set to enabled for the first BWP, a condition that a DTPI information element is configured and set to enabled for the second BWP, a condition that a bit-width of a frequency domain resource assignment (FDRA) field for the first BWP is smaller than a bit-width of an FDRA field for the second BWP in the DCI message, a condition that dynamic switching is configured in a resource allocation information element for the second BWP, or a condition that the DCI message includes a transform precoder indicator field set to disabled.

2. The apparatus of claim 1, wherein the at least one memory and the at least one processor further cause the apparatus to:

based on a second condition being met, consider the received DCI message on the first BWP as invalid, wherein the second condition comprises at least one of:

a condition that a DTPI information element is not configured or is configured and set to disabled for the first BWP, a condition that a DTPI information element is configured and set to enabled for the second BWP, a condition that resource allocation type 0 is configured in a resource allocation information element for the second BWP, a condition that dynamic switching is configured in a resource allocation information element for the second BWP, a condition that a bit-width of a FDRA field for the first BWP is smaller than a bit-width of an FDRA field for the second BWP in the DCI message, or a condition that the DCI message includes a transform precoder indicator field set to enabled.

3. The apparatus of claim 2, wherein the second condition comprises:

the condition that a DTPI information element is configured and set to enabled for the second BWP, the condition that a bit-width of the FDRA field for the first BWP is smaller than the bit-width of the FDRA field for the second BWP in the DCI message, and the condition that dynamic switching is configured in the resource allocation information element for the second BWP.

4. The apparatus of claim 2, wherein the DTPI information element for a BWP indicates that DCI messages used to schedule a PUSCH transmission on the BWP include a transform precoder indicator field.

5. The apparatus of claim 1, wherein the DTPI information element for a BWP indicates that DCI messages used to schedule a PUSCH transmission on the BWP include a transform precoder indicator field.

6. The apparatus of claim 1, wherein the at least one memory and the at least one processor further cause the apparatus to:

not expect the DCI message to indicate the transform precoder indicator to be set to enabled when:

dynamic switching is enabled for the second BWP;

a bit-width of the FDRA field for the first BWP is smaller than a bit-width of the FDRA field for the second BWP in the DCI message; and dynamic switching is configured in a resource allocation information element for the second BWP.

7. The apparatus of claim 6, wherein the at least one memory and the at least one processor further cause the apparatus to:

declare the DCI message invalid when the transform precoder indicator in the DCI message is set to enabled when not expected.

8. An apparatus comprising:

at least one processor; and at least one memory storing instructions that, when executed by the at least one processor, cause the apparatus at least to:

based on a second condition being met, consider a received downlink control information (DCI) message on a first bandwidth part (BWP) as invalid, wherein the DCI message schedules a physical uplink shared channel (PUSCH) transmission and indicates to perform the transmission on a second BWP, and wherein the second condition comprises at least one of:

a condition that a dynamic transform precoder indication (DTPI) information element is not configured or is configured and set to disabled for the first BWP, a condition that a DTPI information element is configured and set to enabled for the second BWP, a condition that resource allocation type 0 is configured in a resource allocation information element for the second BWP, a condition that dynamic switching is configured in a resource allocation information element for the second BWP, a condition that a bit-width of a frequency domain resource assignment (FDRA) field for the first BWP is smaller than a bit-width of an FDRA field for the second BWP in the DCI message, or a condition that the DCI message includes a transform precoder indicator field set to enabled.

9. The apparatus of claim 8, wherein the second condition comprises:

the condition that a DTPI information element is configured and set to enabled for the second BWP, the condition that a bit-width of the FDRA field for the first BWP is smaller than the bit-width of the FDRA field for the second BWP in the DCI message, and the condition that dynamic switching is configured in the resource allocation information element for the second BWP.

10. The apparatus of claim 8, wherein the DTPI information element for a BWP indicates that DCI messages used to schedule a PUSCH transmission on the BWP include a transform precoder indicator field.

11. A method comprising:

receiving a downlink control information (DCI) message on a first bandwidth part (BWP), wherein the DCI message schedules, based on a first condition being met, a physical uplink shared channel (PUSCH) transmission and indicates to perform the transmission on a second BWP, and wherein the first condition comprises at least one of:

a condition that a dynamic transform precoder indication (DTPI) information element is configured and set to enabled for the first BWP, a condition that a DTPI information element is configured and set to enabled for the second BWP, a condition that a bit-width of a frequency domain resource assignment (FDRA) field for the first BWP is smaller than a bit-width of an FDRA field for the second BWP in the DCI message, a condition that dynamic switching is configured in a resource allocation information element for the second BWP, or a condition that the DCI message includes a transform precoder indicator field set to disabled.

12. The method of claim 11, further comprising:

based on a second condition being met, considering the received DCI message on the first BWP as invalid, wherein the second condition comprises at least one of:

a condition that a DTPI information element is not configured or is configured and set to disabled for the first BWP, a condition that a DTPI information element is configured and set to enabled for the second BWP, a condition that resource allocation type 0 is configured in a resource allocation information element for the second BWP, a condition that dynamic switching is configured in a resource allocation information element for the second BWP, a condition that a bit-width of a FDRA field for the first BWP is smaller than a bit-width of an FDRA field for the second BWP in the DCI message, or a condition that the DCI message includes a transform precoder indicator field set to enabled.

13. The method of claim 12, wherein the second condition comprises:

the condition that a DTPI information element is configured and set to enabled for the second BWP, the condition that a bit-width of the FDRA field for the first BWP is smaller than the bit-width of the FDRA field for the second BWP in the DCI message, and the condition that dynamic switching is configured in the resource allocation information element for the second BWP.

14. The method of claim 12, wherein the DTPI information element for a BWP indicates that DCI messages used to schedule a PUSCH transmission on the BWP include a transform precoder indicator field.

15. The method of claim 11, wherein the DTPI information element for a BWP indicates that DCI messages used to schedule a PUSCH transmission on the BWP include a transform precoder indicator field.

16. The method of claim 11, further comprising:

not expecting the DCI message to indicate the transform precoder indicator to be set to enabled when:

dynamic switching is enabled for the second BWP;

a bit-width of the FDRA field for the first BWP is smaller than a bit-width of the FDRA field for the second BWP in the DCI message; and dynamic switching is configured in a resource allocation information element for the second BWP.

17. The method of claim 16, further comprising:

declaring the DCI message invalid when the transform precoder indicator in the DCI message is set to enabled when not expected.

* * * * *